United States Patent
Bagnell et al.

(10) Patent No.: US 12,151,707 B1
(45) Date of Patent: Nov. 26, 2024

(54) LEARNED VALIDATION METRIC FOR EVALUATING AUTONOMOUS VEHICLE MOTION PLANNING PERFORMANCE

(71) Applicant: Aurora Operations, Inc., Pittsburgh, PA (US)

(72) Inventors: James Andrew Bagnell, Pittsburgh, PA (US); Brian Christopher Becker, Pittsburgh, PA (US); Davis Edward King, Billerica, MA (US); Skandavimal Shridhar, Pittsburgh, PA (US); Drew Edward Steedly, Kirkland, WA (US); Xinyan Yan, El Paso, TX (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/633,191

(22) Filed: Apr. 11, 2024

Related U.S. Application Data

(60) Provisional application No. 63/615,853, filed on Dec. 29, 2023.

(51) Int. Cl.
*B60W 60/00* (2020.01)

(52) U.S. Cl.
CPC .................. *B60W 60/001* (2020.02)

(58) Field of Classification Search
None
See application file for complete search history.

(56) References Cited

U.S. PATENT DOCUMENTS 11,150,660 B1  10/2021  Kabirzadeh et al.
11,209,824 B1 * 12/2021  Kingman .............. B60W 30/09
(Continued)

FOREIGN PATENT DOCUMENTS

WO  WO-2017195510 A1 * 11/2017 ............... G05D 1/02
WO  WO-2020044904 A1 *  3/2020 ...... B60W 30/18163

OTHER PUBLICATIONS

R. Bani-Hani, S. H. Aljbour and M. Shurman, "Autonomous Vehicles Trajectory Prediction Approach Using Machine Learning Test," 2023 14th International Conference on Information and Communication Systems (ICICS) (Year: 2023).*

*Primary Examiner* — Khoi H Tran
*Assistant Examiner* — Bryant Tang
(74) *Attorney, Agent, or Firm* — Dority & Manning, P.A.

(57) ABSTRACT

The present disclosure provides an example method for validating a trajectory generated by an autonomous vehicle control system (AV trajectory) in a driving scenario. The example method includes (a) obtaining the AV trajectory and a reference trajectory, wherein the reference trajectory describes a desired motion of a vehicle in the driving scenario; (b) determining a plurality of component divergence values for a plurality of divergence metrics, wherein a respective divergence value characterizes a respective difference between the AV trajectory and the reference trajectory; (c) providing the plurality of component divergence values to a machine-learned model to generate a score that indicates an aggregate divergence between the AV trajectory and the reference trajectory, wherein the machine-learned model comprises a plurality of learned parameters defining an influence of the plurality of component divergence values on the score; and (d) validating the AV trajectory based on the score.

20 Claims, 15 Drawing Sheets

(56) References Cited

U.S. PATENT DOCUMENTS

| | | |
|---|---|---|
| 11,415,997 B1 | 8/2022 | Dolan |
| 11,565,709 B1 | 1/2023 | Caldwell et al. |
| 2019/0156150 A1 | 5/2019 | Krishnan |
| 2020/0050536 A1* | 2/2020 | Nygaard .............. G06F 11/3684 |
| 2021/0261156 A1 | 8/2021 | Ackenhausen et al. |
| 2021/0403033 A1 | 12/2021 | Cohen et al. |
| 2022/0266859 A1 | 8/2022 | Semple et al. |
| 2022/0315052 A1 | 10/2022 | Oboril et al. |
| 2023/0067822 A1* | 3/2023 | Jiang ............... B60W 30/18154 |
| 2024/0017741 A1* | 1/2024 | Sandberg ........... G01C 21/3407 |

* cited by examiner

LEARNED VALIDATION METRIC FOR EVALUATING AUTONOMOUS VEHICLE MOTION PLANNING PERFORMANCE

PRIORITY

This application claims priority to and the benefit of U.S. Provisional Patent Application No. 63/615,853 (filed Dec. 29, 2023). U.S. Provisional Patent Application No. 63/615,853 is hereby incorporated by reference herein in its entirety.

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure relate to validating test trajectories for controlling autonomous vehicles by evaluating a match or alignment between the test trajectories and exemplar trajectories. A validation system can receive a test trajectory generated by an autonomous vehicle motion planner and an exemplar reference trajectory that demonstrates a desired trajectory in a particular scenario. The validation system can process the test trajectory and the reference trajectory using multiple divergence metrics configured to characterize aspects in which the test trajectory diverges from the reference trajectory. The validation system can use the divergence metrics to obtain component divergence values. The validation system can form an overall judgment regarding the differences between the test trajectory and the reference trajectory using a score that represents an aggregate divergence value that flows from the various component divergence values. A machine-learned model can generate the scores by processing various features of the respective trajectories. Using the scores, the validation system can evaluate the materiality of differences between trajectories. The validation system can cause the more material divergences to have a greater influence on the aggregate divergence value than less material divergences.

Example validation systems according to the present disclosure can validate test trajectories against an exemplar with improved robustness to immaterial deviations. For example, a trajectory for navigating a given driving scenario can be parameterized along many dimensions (e.g., vehicle position, velocity, acceleration, rotation, etc.). An exemplar trajectory can have one set of trajectory parameter values, and those values can cause the exemplar trajectory to achieve a level of performance or quality (e.g., low cost, high reward, etc.) that is desired from the test trajectory. Often, however, other parameter values can result in different trajectories that can effectively achieve the same level of performance. In this manner, for instance, the domain of "valid" trajectories can be defined by an envelope of valid parameter values.

The envelope of valid parameter values can have complex boundaries. This complexity can arise from highly nonlinear interactions of different parameters. As such, a validation system according to the present disclosure can employ a machine-learned model to map the complex decision boundary around valid matches between the test and reference trajectories. The machine-learned model can discern between material and immaterial divergences by adjusting the influence of the component divergence values on the ultimate aggregate divergence value. The example validation system can thus be capable of validating trajectories that are materially equivalent to the exemplar, even if they diverge in aspects that are immaterial to performance.

An example validation system can model complex validation boundaries by decomposing the validation problem into separable components. For instance, a divergence metric can characterize how a test trajectory is different from a reference trajectory in a particular aspect. One or more weighting values (e.g., using the machine-learned model) can characterize how much that difference matters to the validity of the trajectory. In combining the constituent components, then, the example validation system can discern whether the test trajectory agrees with the reference trajectory in the aspects that are material to validity.

For example, the machine-learned model can weight the component divergence values to adjust their respective influences on the aggregate. The machine-learned model can include scaling weights that scale a magnitude of the component divergence values. The validation system can combine the scaled component divergence values to obtain the aggregate divergence value. For instance, the aggregate divergence value can be a linear combination of the component divergence values with learned coefficients. The machine-learned model can be a neural network configured to generate an aggregate divergence value based on the component divergence values (e.g., and other contextual inputs).

An example validation system can leverage context-based weighting in conjunction with learned weighting of the component divergence values. For example, a context metric can process information about the test trajectory to output a context value that can modify an influence of a given component divergence value. For instance, a context metric can reflect physics-based rules, regulation-based rules, or other external priors that can bias the validation system to prioritize differences according to the external factors.

For example, a temporal context metric can adjust an influence of divergences between the test trajectory and the reference trajectory as a function of time. Predictions of a world state toward the end of a trajectory can be associated with a lower confidence than a world state near the beginning of a trajectory. Accordingly, the materiality of disagreements between the test trajectory and the reference trajectory at some future time can be less certain. For instance, a real-world environment is generally interactive, and if the environment adapts to early divergences in the test trajectory, this adaptation can cause an end state of the environment to diverge from an end state associated with the reference trajectory. In recognition of this variability, example validation systems can decrease an impact of divergences as a function of time.

Another example context metric includes a measure of lane overlap. For example, a test trajectory can decrease in proximity of an ego vehicle to another vehicle as compared to a reference trajectory. However, this decreased proximity can be less important if the test trajectory places the ego vehicle with only small overlap in the lane held by the other vehicle. For example, a lane change maneuver to pass a leading vehicle can involve moving closer to the leading vehicle while laterally moving around the vehicle. Generally, these motions can be conducted simultaneously, such that the ego vehicle smoothly accelerates diagonally into the adjoining lane. If the test trajectory places the ego vehicle 2 meters closer to the leading vehicle, the impact of that difference on the aggregate divergence value can depend on whether the ego vehicle is 2 meters closer while 90% in the lane (e.g., when the lane change has barely begun) or is 2 meters closer when only 5% in the lane (e.g., when the lane change is nearly complete). For instance, it can be more important to maintain a given following distance when the ego vehicle is entirely within the lane, as an evasive maneuver to exit the lane would involve moving the ego vehicle a greater distance as compared to the situation in which the ego vehicle is already almost entirely out of the lane.

The machine-learned model can learn a desired decision boundary using a curated set of trajectory matches. For instance, a curated set of trajectory matches can include positive match examples and negative match examples. Parameters of the machine-learned model can be optimized to accurately distinguish the positive match examples and the negative match examples. For example, the curated set of trajectory matches can be support vectors that allow a support vector machine to draw a decision boundary around valid matches.

The validation system can self-calibrate using a dataset of unit tests. The unit tests can include a variety of trajectory matches. For example, a unit test can be a pair of a test trajectory and a reference trajectory that are known to be an accurate match (e.g., a sufficiently accurate positive match). A unit test can be a pair of a test trajectory and a reference trajectory that are known to be an inaccurate match (e.g., a negative match, or a match with too much error). A unit test can be a pair of a test trajectory and a reference trajectory that are known to be a spurious pairing (e.g., the test trajectory fails to correspond to any existing reference trajectory). The validation system can learn values for one or more learnable parameters by fitting its outputs to the known match labels of the unit tests. For instance, the validation system can perform an optimization routine to determine weight values that cause the aggregate divergence values for each unit test to correspond to a range of values associated with the known match label for that test (e.g., above a first threshold for an accurate match, between the first threshold and a second threshold for an inaccurate match, below a third threshold for a spurious pair, etc.).

Using unit tests to self-calibrate can simplify and accelerate the refinement of the validation system. For example, if the validation system does not correctly match a pair, then that incorrect match can be corrected (e.g., manually, automatically) and added as a unit test. The validation system can then re-calibrate over the new set of unit tests. The validation system itself can adapt its weighting to refine the decision boundary without requiring extensive manual deconstruction of each failure mode.

To maintain performance on new match pairs (e.g., not in the bank of unit tests), the validation system can employ constraints to avoid overfitting. The validation system can constrain the weights to a half-space of possible values so that the direction of a particular metric's contribution to the aggregate value is preserved. For instance, a weight applied to a divergence metric can be constrained to be positive to prevent the validation system optimization from flipping the sign of the weight and treating the metric as a reward. By giving each weight limited power, the validation system's self-calibration can have more limited opportunity to overfit by exploiting any given metric's weight to compensate for missing context. For instance, a highly nonlinear weighting configuration could potentially overfit by learning to artificially penalize certain metrics to force alignment with a set of unit tests. With these constraints, a failure to align with all unit tests can then be a signal that potentially relevant context may not be available to the validation system.

To facilitate improved interpretability, the validation system can constrain the aggregate divergence computation to be linear in its parameters. For instance, this constraint can allow for confirmation that—all else being equal—a change in a component divergence value will cause the aggregate divergence value to change in an expected direction.

Example implementations of the present disclosure provide a number of technical effects and advantages. By decomposing the validation problem, example validation systems can provide improved interpretability of validation decisions. This can aid diagnosis of and iterative improvements to the validation system itself as well as helping identify aspects of the test trajectories that are leading to validation failures. Furthermore, by better modelling the complex decision boundaries for valid trajectory comparisons, example validation systems can automate review and scoring of test scenarios, thereby allowing significantly higher test volume at much greater speed. This can facilitate robust testing and evaluation of autonomous vehicle motion planners at a scale previously unattainable using traditional techniques which required intense manual scoring and review of test scenarios.

In this manner, for example, example implementations of the present disclosure can improve the operation of autonomous vehicles and advance the field of autonomous navigation as a whole. Example implementations of the present disclosure can lower a cost and increase an efficiency of performing motion planner validation, unlocking new capacity to quickly refine and develop improved motion planners for controlling autonomous vehicles. In this manner, for instance, example implementations of the present disclosure can accelerate the adoption of autonomous vehicles, thereby facilitating improved traffic flow, decreasing opportunity for human driver error, increasing energy-efficient driving behavior, etc. across greater numbers of vehicles, thereby achieving not only individual performance gains but also significant population-wide improvement.

For example, in an aspect, the present disclosure provides an example method for validating a trajectory generated by an autonomous vehicle control system (AV trajectory) in a driving scenario. The example method includes (a) obtaining the AV trajectory and a reference trajectory, wherein the reference trajectory describes a desired motion of a vehicle in the driving scenario. The example method includes (b) determining a plurality of component divergence values for a plurality of divergence metrics, wherein a respective divergence value characterizes a respective difference between the AV trajectory and the reference trajectory. The example method includes (c) providing the plurality of component divergence values to a machine-learned model to generate a score that indicates an aggregate divergence between the AV trajectory and the reference trajectory, wherein the machine-learned model includes a plurality of learned parameters defining an influence of the plurality of component divergence values on the score. The example method includes (d) validating the AV trajectory based on the score.

In some implementations, the example method includes, prior to (c), determining the plurality of learned parameters based on a plurality of training examples. In some implementations of the example method, a respective training example includes (i) a plurality of component divergence values characterizing a difference between a training trajectory and a reference trajectory and (ii) a label indicating a divergence between the training trajectory and the reference trajectory.

In some implementations of the example method, the label indicates whether there is a material divergence between the training trajectory and the reference trajectory.

In some implementations of the example method, the plurality of learned parameters respectively correspond to the plurality of divergence metrics.

In some implementations, the example method includes weighting a respective contribution of the respective component divergence value using a context value obtained using a context metric. In some implementations of the example method, the context value indicates a relationship between the AV trajectory and an environment of the driving scenario. In some implementations of the example method, the respective component divergence value indicates a relationship between the AV trajectory and the reference trajectory.

In some implementations, the example method includes determining, using the context metric and based on an attribute of the AV trajectory or the reference trajectory, a context domain for the respective component divergence value. In some implementations, the example method includes weighting the respective contribution of the respective component divergence value based on a weighting parameter associated with the context domain.

In some implementations of the example method, the context metric maps a plurality of context domains over a decision tree.

In some implementations of the example method, the context metric measures an interval between: a validation time; and a time associated with the respective component divergence value.

In some implementations of the example method, the score includes a weighted combination of the plurality of component divergence values.

In some implementations of the example method, the weighted combination is a linear combination.

In some implementations of the example method, at least one divergence metric corresponds to a divergence encoder that is configured to generate, based on the test trajectory and using one or more machine-learned parameters, the respective component divergence.

In some implementations of the example method, validating the AV trajectory includes comparing the score to a threshold.

In some implementations of the example method, the machine-learned model is optimized based on constraints indicated by a curated set of AV trajectories and reference trajectories.

In some implementations of the example method, the curated set of trajectory matches includes positive match examples and negative match examples. In some implementations of the example method, the machine-learned model defines a decision boundary for classifying the positive match examples and the negative match examples.

In some implementations of the example method, the machine-learned model includes a support vector machine.

In some implementations of the example method, a positive match example is an example in which a first aggregate divergence between a first respective AV trajectory and a first respective reference trajectory is below a threshold. In some implementations of the example method, a negative match example is an example in which a second aggregate divergence between a second respective AV trajectory and a second respective reference trajectory is above the threshold.

In some implementations of the example method, the AV trajectory describes a planned trajectory output by a motion planner of the autonomous vehicle control system operating in open loop.

In some implementations of the example method, the AV trajectory describes executed behavior of an autonomous vehicle controlled by the autonomous vehicle control system operating in closed loop.

In an aspect, the present disclosure provides an example one or more non-transitory computer-readable media storing instructions that are executable by one or more processors to cause a computing system to perform operations for validating a trajectory generated by an autonomous vehicle control system (AV trajectory) in a driving scenario. In the example one or more non-transitory computer-readable media, the operations include any one or multiple of the implementations of the example method.

In an aspect, the present disclosure provides an example computing system. The example computing system includes one or more processors. The example computing system includes one or more non-transitory computer-readable media storing instructions that are executable by the one or more processors to cause the computing system to perform operations for validating a trajectory generated by an autonomous vehicle control system (AV trajectory) in a driving scenario. In the example computing system, the operations include any one or multiple of the implementations of the example method.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
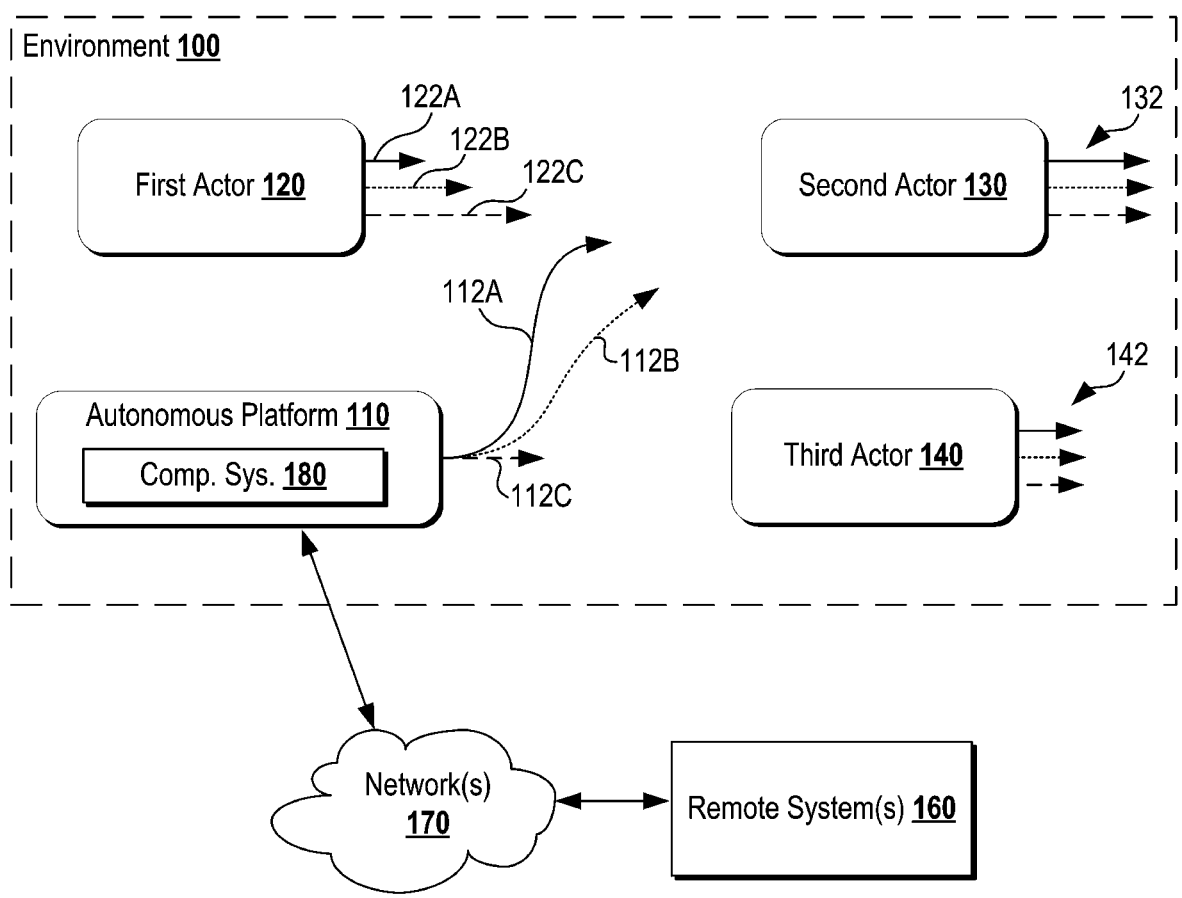
FIG. 1 is a block diagram of an example operational scenario, according to some implementations of the present disclosure.

With reference to FIGS. 1-13, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
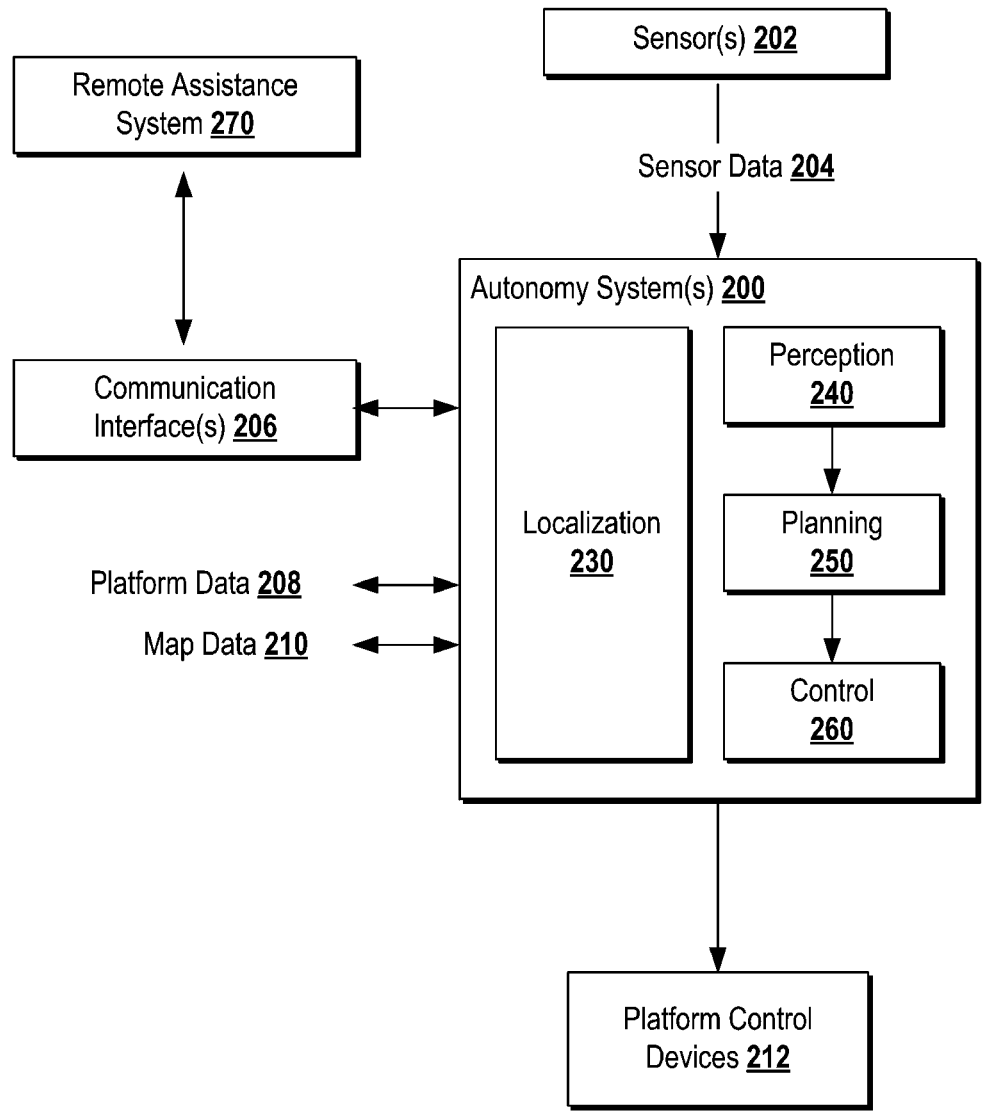
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans.

By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 can evaluate each of the potential platform trajectories and predict its impact on the environment.

For example, the autonomous platform 110 (e.g., using its autonomy system 200) can determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally or alternatively, the autonomous platform 110 can determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally or alternatively, the autonomous platform 110 can determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
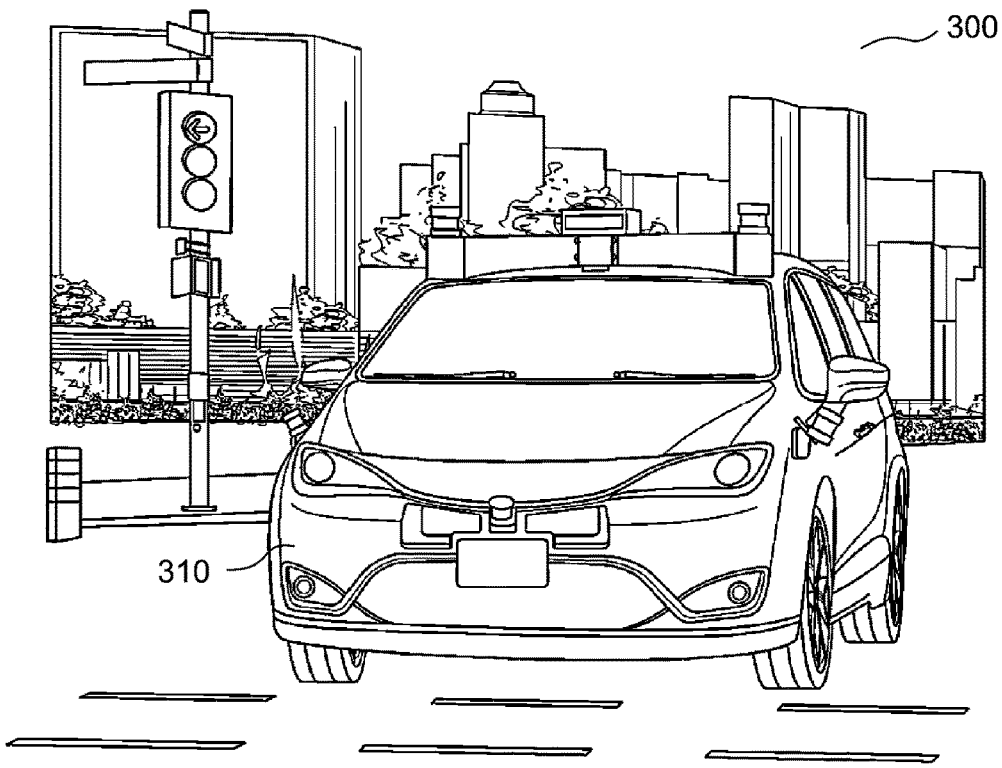
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
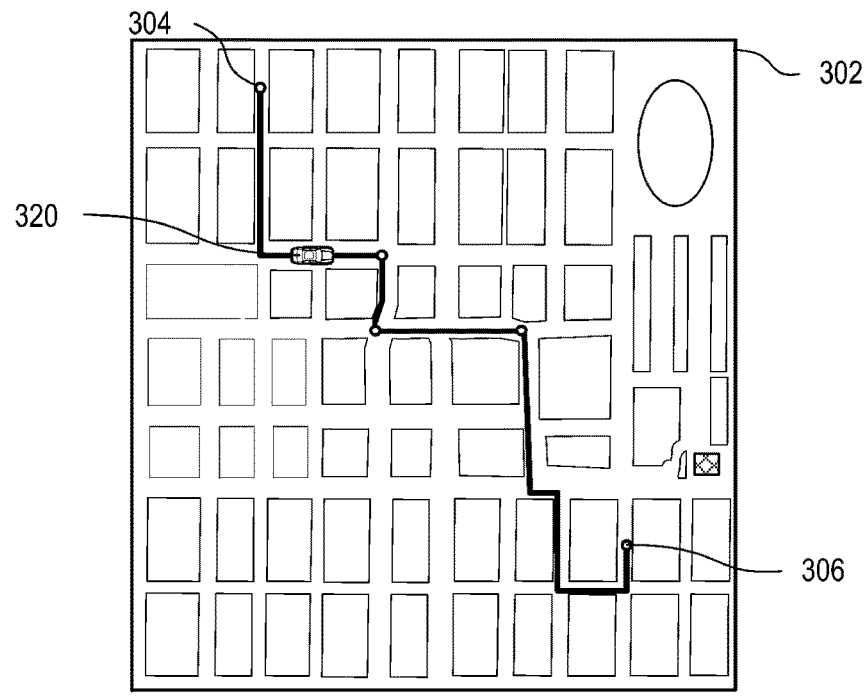
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
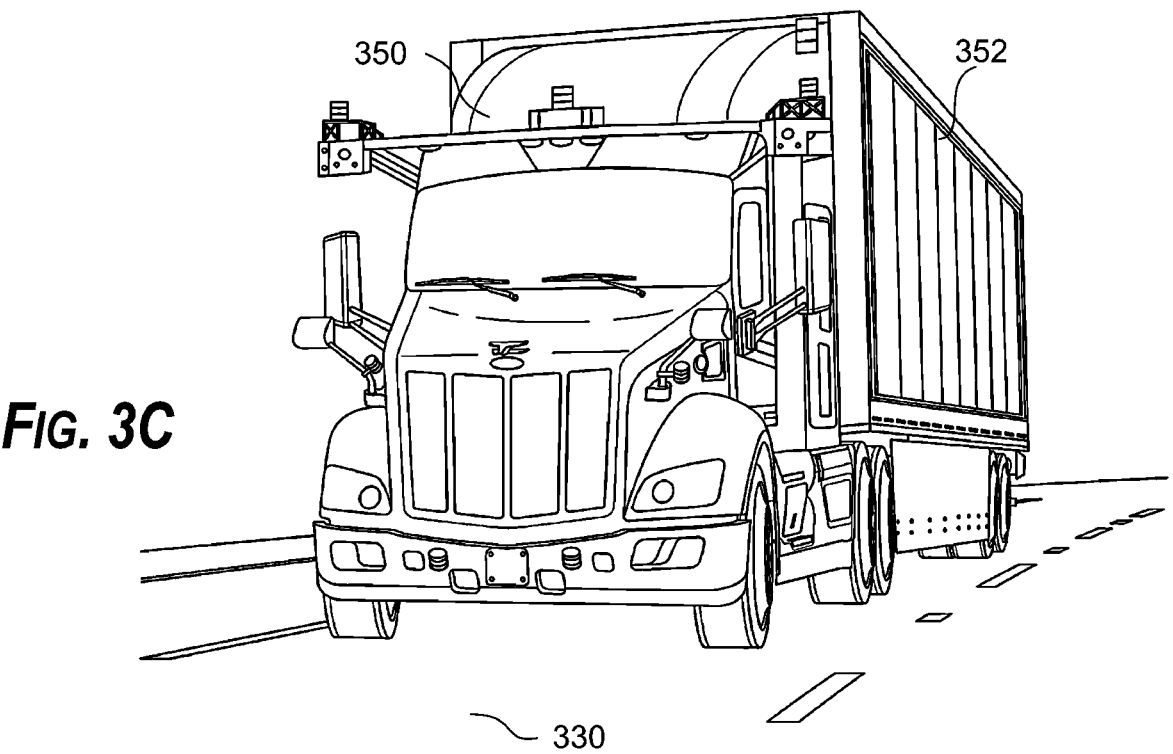
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
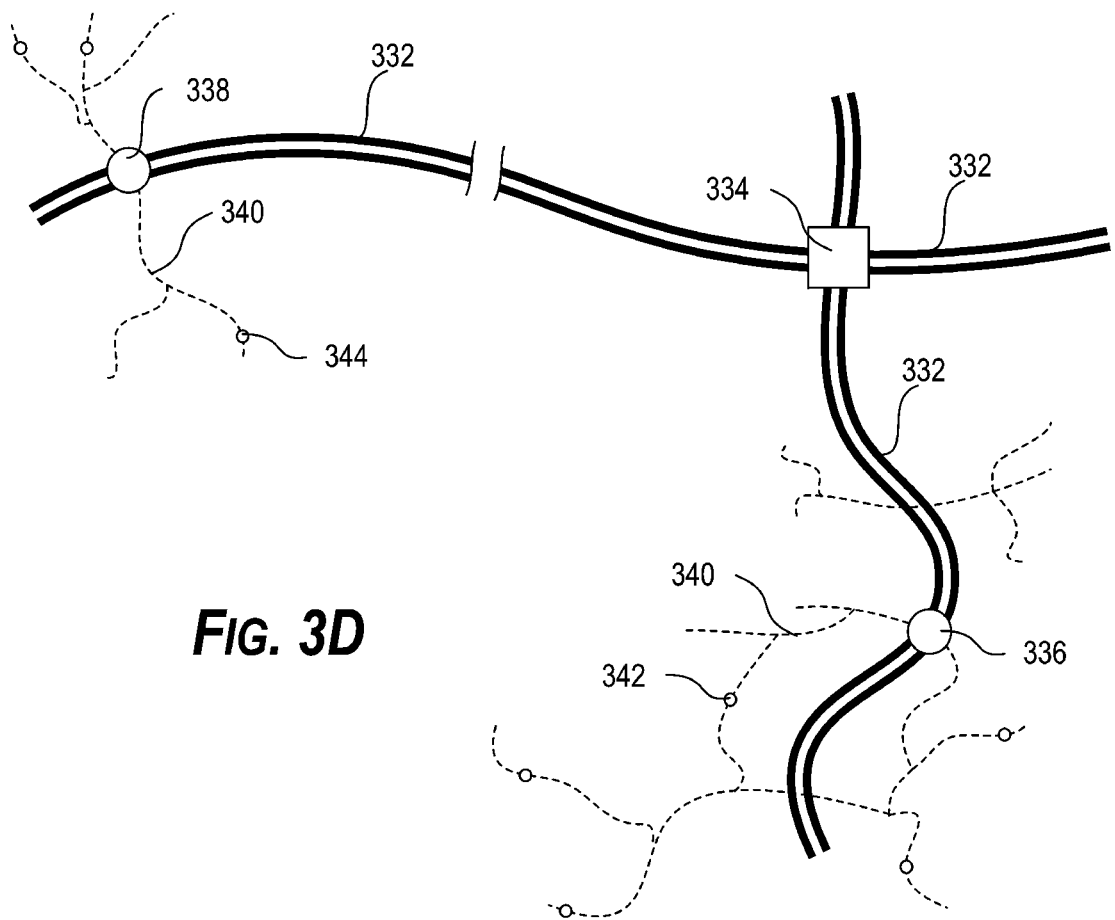
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), the autonomous platform can implement validation techniques according to example aspects of the present disclosure.

Figure 4:
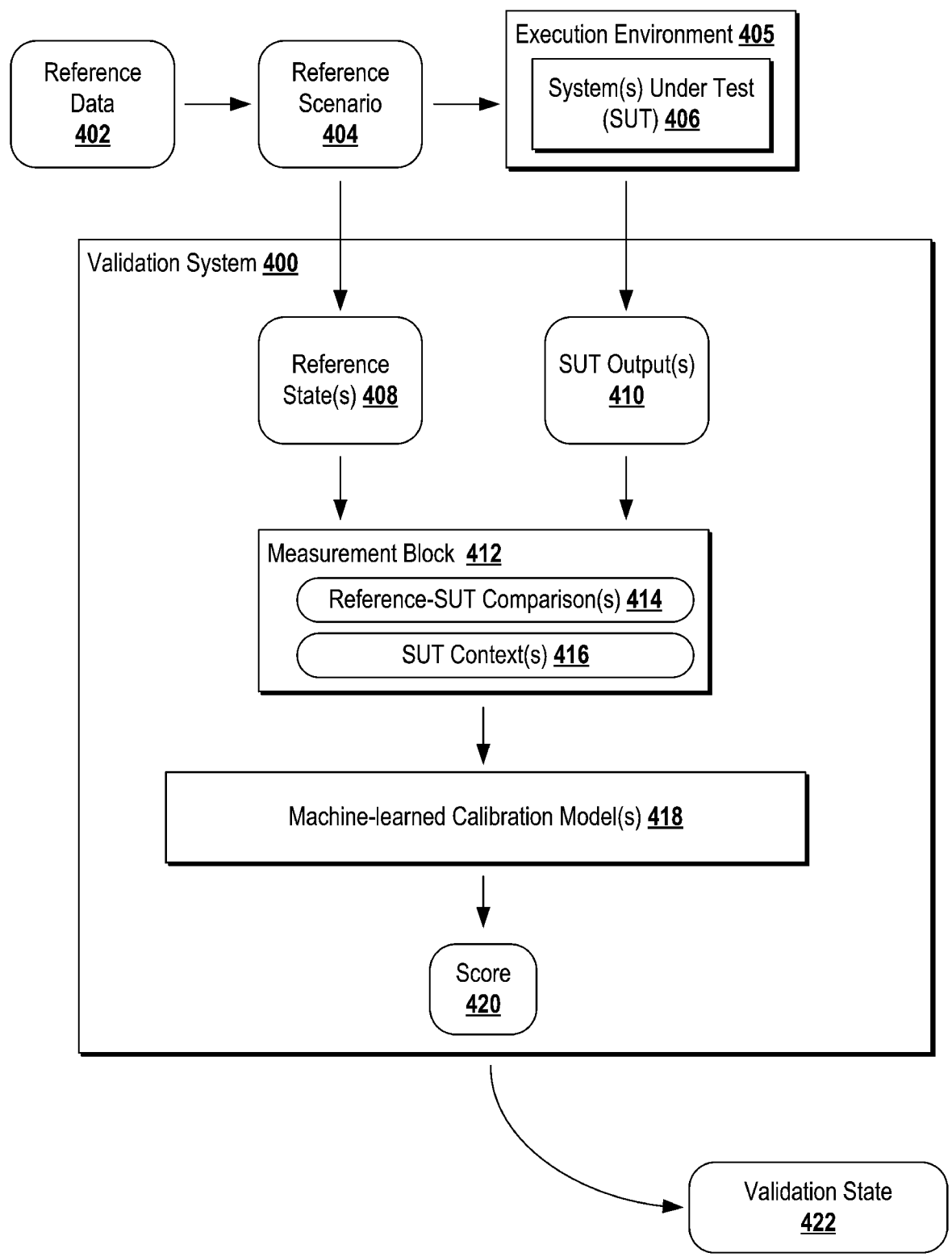
FIG. 4 is a block diagram of an example validation system, according to some implementations of the present disclosure.

FIG. 4 is a block diagram of a validation system 400, according to some implementations of the present disclosure. Although FIG. 4 illustrates an example implementation of a validation system 400 having and interacting with various components, it is to be understood that the components can be rearranged, combined, omitted, etc. within the scope of and consistent with the present disclosure.

A validation system 400 can process reference data 402 to extract a reference scenario 404. Reference data 402 can include log data or label data that describes desired behavior for a system under test (SUT) 406. SUT 406 can execute in an execution environment 405. Reference scenario 404 can be a portion of reference data 402 that describes a particular desired action or desired operation that provides an exemplar against which SUT 406 is to be compared. In some cases, reference scenario 404 can also include data that describes the scene in which the desired action or operation is performed. For example, reference scenario 404 can include data about actors or objects in the scene.

To evaluate the performance of SUT 406 in reference scenario 404, validation system 400 can extract one or more reference states 408 from reference scenario 404. For example, reference states 408 can include a reference trajectory traversed by a reference actor. Validation system 400 can receive, from SUT 406, one or more SUT outputs 410 that describe states of the SUT in reference scenario 404. For example, to validate the motion planning performance of SUT 406, a reference state 408 can include a reference trajectory and a SUT output 410 can include a SUT trajectory.

A measurement block 412 can measure various aspects of reference states 408 and SUT output(s) 410. For example, measurement block 412 can generate one or more reference-SUT comparisons 414 that can characterize differences between reference states 408 and SUT outputs 410. Measurement block 412 can generate one or more SUT contexts 416 that can describe operations of SUT 406 with respect to reference scenario 404.

A machine-learned calibration model 418 can process the measurements from measurement block 412 and generate a score 420 that can characterize whether SUT outputs 410 are materially different from reference states 408. For example, machine-learned calibration model 418 can process reference-SUT comparisons 414 and SUT contexts 416 and evaluate whether the detected differences amount to an overall material difference. For example, machine-learned calibration model 418 can determine an influence of reference-SUT comparisons 414 on the resulting score 420. In this manner, for instance, machine-learned calibration model 418 can calibrate the influence of the differences between reference states 408 and SUT outputs 410.

Validation system 400 can output a validation state 422 for SUT 406 based on score 420. For instance, validation system 400 can output a positive validation state if score 420 is below a threshold (e.g., the differences between reference states 408 and SUT outputs 410 are not material).

Reference data 402 can include recorded instances of real-world or simulated driving. The recorded data can include data collected by sensors onboard one or more vehicles (e.g., autonomous vehicles, non-autonomous vehicles, etc.). The recorded data can include data collected from other sources (e.g., roadside cameras, aerial vehicles, etc.). Reference data 402 from simulated scenarios can include probabilistic data, such as data sampled from a distribution fitted to a number of observations.

Reference data 402 can include trajectory data. For example, reference data 402 can include recorded trajectories of an actor and data describing the environment in which the actor moves (e.g., map data, perception data). Reference data 402 can include real or synthetic trajectories. Real trajectories can include trajectories traversed by a vehicle in a real-world environment (e.g., by a human-driven vehicle, an autonomous vehicle). Synthetic trajectories can include trajectories traversed by a simulated vehicle in a simulated environment (e.g., a simulation implementing an autonomous vehicle control system to control a simulated vehicle). Synthetic trajectories can include trajectories drawn or otherwise annotated using a review system (e.g., by a human annotator, an automated annotator) to indicate a trajectory that a vehicle should travel in a given situation.

Reference scenario 404 can include a portion of reference data 402 that describes a scene or event of interest. Reference scenario 404 can include a segment of a larger driving sequence. For example, reference data 402 can include data describing many minutes or hours of driving behavior. Reference scenario 404 can include data that focuses on a particular maneuver (e.g., a lane change, navigating an intersection, performing an evasive maneuver, etc.). Reference scenario 404 can include data describing an environment, including objects, actors, etc. A reference actor or exemplar can be an object or actor that is a subject of study during the validation. The exemplar can be an actor that demonstrates desired behavior against which SUT 406 can be validated.

Validation system 400 can select reference scenario 404 for validating SUT 406 based on one or more attributes of reference scenario 404. For example, reference scenario 404 can describe a particular situation of interest in which it is desired to confirm how SUT 406 performs. For example, reference scenario 404 can correspond to a standardized test scenario established by regulation (e.g., regulations promulgated by one or more government agencies).

Validation system 400 can select reference scenario 404 based on a benchmark set maintained by validation system 400. For example, validation system 400 can maintain a benchmark set that identifies reference scenarios 404 (or reference states 408) that explore edge cases of driving dynamics, navigation decision-making, etc. The benchmark set can be configured to provide examples that help define a boundary of SUT behavior.

For example, the benchmark set can include a first reference scenario in which the speed limit is an appropriate speed to travel in a set of driving conditions and a second reference scenario in which the speed limit is too fast in a different set of driving conditions. The decision boundary between the speed limit being appropriate and the speed limit being too fast can be traced along axes that correspond to the driving conditions. While it may be difficult to precisely identify the exact set of driving conditions under which a speed limit transitions to being too fast for a given scenario, validating a SUT against both the first and second reference scenarios can provide an initial indication that the SUT can make the correct decisions in each of the reference scenarios.

In this manner, for instance, validating SUT 406 against a benchmark set that contains examples that constrain decision boundaries can help identify whether SUT 406 adheres to the desired decision boundaries. As more and more reference scenarios are added to the benchmark set, the decision boundaries of SUT 406 can be tested with increasing precision. If SUT 406 can achieve satisfactory performance over the benchmark set, validation system 400 can determine that SUT 406 has demonstrated at least a benchmark level of performance in a baseline range of situations and is likely to resolve novel situations consistent with the boundaries constrained by the benchmark set.

Execution environment 405 may be a real or simulated environment. For example, if SUT 406 includes a motion planning system that is configured to receive data inputs and generate motion planning outputs (e.g., trajectories), an operating platform can include a real or virtual machine with one or more real or virtual processors, memory, storage, etc. that enable execution of one or more operations of the motion planning system. Execution environment 405 can facilitate operation or simulation of sensor devices as well for end-to-end evaluation of SUT 406 in a simulated environment. Execution environment 405 can include systems of an autonomous vehicle. Execution environment 405 can be an online execution environment in use during operation of the autonomous vehicle or an offline execution environment that can be used when the autonomous vehicle systems are otherwise not being used for autonomous driving tasks. For example, motion plans generated during operation of the autonomous vehicle can be stored for later validation using validation system 400 (e.g., validation against human operator inputs/interventions applied during operation of the autonomous vehicle).

System under test (SUT) 406 can be or include one or more operational systems of an autonomous vehicle. For instance, SUT 406 can include one or more autonomy systems or one or more systems operating in support of an autonomy system. For instance, SUT 406 can include one or more portions of autonomy system 200, such as a localization subsystem 230, a perception subsystem 240, a planning subsystem 250, a control subsystem 260, etc. In some examples, SUT 406 can include real or simulated sensor(s) 202, communication interface(s) 206, remote assistance system 270, platform control devices 212, etc. SUT 406 can include one or more machine-learned models.

Reference states 408 can include values drawn from reference scenario 404. For example, reference scenario 404 can be a segment of a recorded time history that covers an actor's navigation around a shouldered vehicle, and reference states 408 can include parameter values that characterize the trajectory traversed by the actor, state data for objects in the environment, map data, etc. For instance, in a reference scenario including an exemplar actor passing a shouldered vehicle, reference states 408 can include an amount of deceleration (or decrease in acceleration) of the exemplar actor as the exemplar actor approaches the shouldered vehicle. This can be reflected explicitly in terms of acceleration or can be indicated by recorded positions over time. In another example, in a reference scenario including an exemplar actor maintaining a steady-state cruise on a highway, reference states 408 can include an amount of distance maintained behind a leading vehicle. In another example, in a reference scenario including an exemplar actor merging (or traveling in a lane being merged into), reference states 408 can include an amount of acceleration or deceleration applied to facilitate the merge with other vehicles. Reference states 408 can describe a guarding maneuver undertaken to reduce a likelihood of a severe event or to reduce a severity of a severe event.

SUT outputs 410 can describe system or vehicle states or actions a subject vehicle implementing SUT 406 would execute in reference scenario 404. This can provide a direct comparison against reference states 408, since reference scenario 404 presents the same circumstances that led the exemplar actor to achieve reference states 408. SUT outputs 410 can vary based on the type of SUT being validated. For validating a motion planner in SUT 406, SUT outputs 410 can include one or more candidate motion plans, a motion plan selected for execution, a trajectory that is traversed in the environment (e.g., as a result of executing one or more motion plans), etc.

SUT outputs 410 can describe closed loop SUT behavior or open loop SUT behavior. Closed loop evaluation can include determining what actions or operations SUT 406 performs over time while interacting with reference scenario 404. For example, closed loop evaluation can include determining whether a simulated AV would remain stopped at an intersection for a duration of a stoplight and then enter and cross the intersection after the light turns green. During closed loop evaluation, SUT 406 can benefit from feedback from the environment and adapt its behavior accordingly (e.g., reacting to the light turning green). Closed-loop behavior can span multiple processing cycles of, for example, a motion planner, as the motion planner can provide updated motion plans to adapt the motion of the vehicle as it moves through the environment. In an aspect, closed loop evaluation can focus on what a SUT does in lieu of or in addition to what the SUT expects or plans to do. Closed loop evaluation can be referred to as "on policy" evaluation.

Open loop evaluation can include determining what actions or operations SUT 406 plans to do based on a current state (which can include prior observations) of a scenario. For example, open loop evaluation can include comparing a selected motion plan generated by SUT 406 with a trajectory described by reference states 408. In this manner, for instance, validation system 400 can evaluate whether SUT 406 generates and correctly prioritizes a motion plan that reflects appropriate behavior in the circumstances. Open loop evaluation can be implemented in as few as a single cycle of a motion planner, for instance. In an aspect, open loop evaluation can focus on what the SUT expects or plans to do, with the expectation that appropriate plans across a wide range of scenarios will facilitate appropriate operation over such scenarios. Open loop evaluation can be referred to as "off policy" evaluation.

Closed loop evaluation can be more expensive to implement on a per-sample basis. For example, closed loop evaluation can involve simulating multiple processing cycles over an extended time period (e.g., executing a full autonomy stack to generate motion plans at 10 hz over a 5 s interval). In contrast, open loop evaluation can obtain plans in a single forward pass. However, closed loop evaluation can capture the SUT's ability to react within a given reference scenario. To evaluate reactivity with open loop evaluation, more samples can be used to provide the SUT an opportunity to generate plans in response to diverse inputs. In some aspects, a closed loop evaluation can be understood as a product of multiple open-loop executions that each start from an initial state defined by a prior execution.

Open loop evaluation can be highly parallelizable, since it can operate without dependency on sequential updates to a vehicle state over time. Closed loop evaluation can be difficult to implement in a highly parallel manner, since future states of the SUT can depend on prior choices made by the SUT.

Open loop evaluation can encounter difficulties when an environment changes significantly over time. For instance, a motion plan can be based on forecasts over a time horizon, but the environment can change over that time and render at least some aspects of the initial plan invalid. For example, an AV SUT in a scenario sitting at a stoplight might not have knowledge of when the light will change. The AV SUT can generate a motion plan that includes instructions for the AV to remain stopped for 5 seconds. However, if the light were to immediately change after generation of the motion plan, reference states 408 might indicate that a reference actor began traveling after 2 seconds. Even though the AV's plan indicated remaining stopped for 5 seconds, this difference does not necessarily indicate that the AV SUT performed incorrectly: it may well have generated the best decision given the available information at the time.

Accordingly, validation system 400 can determine whether a given reference scenario 404 would be suitable for open loop evaluation. Validation system 400 can check one or more changes in reference states 408 that describe states of the environment to evaluate whether a change is so substantial that open loop testing might be inappropriate beyond a certain time region. For example, validation system 400 can truncate a reference scenario to include only a segment with sufficiently stable states of salient parameters such that a plan generated at an initial time is fairly compared over the duration of the scenario. Validation system 400 can identify reference scenarios 404 that are categorically excluded from open loop testing. For example, reference scenarios that include a change in a stoplight or other sudden changes in an environment can be screened out from open loop testing or modified (e.g., truncated) before open loop testing.

Validation system 400 can use one or more machine-learned models to identify reference scenarios 404 that would have less value for open loop testing. For example, a machine-learned model can be trained to identify whether a change in environmental state would cause a reasonable driver to behave differently. For instance, a training corpus can include a set of reference scenarios that include various state changes, and a computing system can store labels indicating whether the state change would cause a human driver to behave differently. The machine-learned model can be trained using the training corpus and deployed to evaluate new reference scenarios to identify scenarios or portions of scenarios that would be less valuable for open loop testing.

Measurement block 412 can include logic executed by validation system 400 to extract salient features of reference states 408 and SUT outputs 410. Measurement block 412 can include one or more machine-learned models or components. For example, measurements by measurement block 412 can be directly extracted from reference states 408 or SUT outputs 410, can be inferred therefrom using a machine-learned model, or can be obtained using one or more transformations applied to reference states 408 or SUT outputs 410.

In general, measurement block 412 can generate values that represent aspects in which SUT outputs 410 diverge from reference states 408. Divergence can be represented by differences between reference states 408 and SUT outputs 410. Divergences can correspond to divergences in underlying probability distributions of likely behavior. For instance, SUT outputs 410 obtained from a probabilistic system can represent a "sample" from a distribution of responses to a reference scenario. A goal can be to validate whether SUT 406 follows a distribution of probable behavior that aligns with probable behavior of a reference actor.

Measurement block 412 can measure divergence directly by obtaining one or more probability distributions from SUT 406 and obtaining one or more probability distributions that characterize expected reference actor behavior (e.g., as aggregated over a corpus of reference actor behavior) and compute a divergence therebetween (e.g., a forward or reverse KL divergence, or an interpolation therebetween).

Measurement block 412 can estimate or approximate divergences using a collection of divergence metrics that can be aggregated to obtain an overall measure of divergence.

Reference-SUT comparisons 414 can include comparisons of reference states 408 and SUT outputs 410. The comparisons can include measured differences between reference states 408 and SUT outputs 410 (e.g., a difference in speed, a difference in lateral acceleration, differences in lane position, etc.). The comparisons can include measured differences between respective states of each as determined with respect to the environment. For instance, a reference state 408 can include a position of an exemplar vehicle at a particular time that is a first distance away from an object in the environment (e.g., another vehicle). A SUT output 410 can include a position output by the SUT for the particular time that is a second distance away from the object. Reference-SUT comparisons 414 can include a difference between the first distance and the second distance.

SUT context 416 can include or be based on data describing pertinent characteristics of SUT outputs 410 with respect to reference scenario 404. For example, SUT context 416 can correspond to a relative importance of a particular reference-SUT comparison 414. For example, a reference-SUT comparison value can be a difference in timing of a lane change: a reference actor can change lanes later while the SUT changes lanes sooner. This difference might be immaterial, however, if there is ample lead time to a desired next turn or exit and there is no intervening traffic to consider. Thus, an example SUT context 416 can include a value based on the lead time to a desired next turn or exit or an amount of intervening traffic. Such a value can contextualize the reference-SUT comparison value (e.g., scale, weight, deprioritize, etc.).

SUT context 416 can be generated by hand-tuned or engineered components. Engineered components can implement inductive or deductive operations. For instance, an engineered logic or rule can be deduced a priori from laws of physics, kinematics, known constraints, etc. For example, a lead time to a desired next turn can be an engineered context because it is derived from an a priori understanding of preferences and expectations for road users.

SUT context 416 can be generated by machine-learned components. Machine-learned components can perform inference over inputs to generate outputs. For instance, machine-learned components can infer, based on patterns seen across many training examples, that a particular input maps to a particular output. For example, a context value that contextualizes a particular comparison value can be generated by a machine-learned model. The model can be trained to contextualize comparison values in a manner that improves an evaluation capability of validation system 400 (e.g., decreases false positives, decreases false negatives, etc.).

Measurement block 412 can generate values that are strictly non-increasing in "goodness" or desirability. Measurement block 412 can generate values that are strictly non-decreasing in divergence. For example, values of reference-SUT comparisons 414, SUT context 416, or both (e.g., the products thereof) can be determined such that as the magnitude of the values of reference-SUT comparisons 414, SUT context 416, or both (e.g., the products thereof) increase, the agreement or match between reference states 408 and SUT outputs 410 can be strictly non-increasing. This constraint can facilitate efficient construction of decision boundaries for individual parameters. For instance, under such a constraint, it can be noted that an increase in one metric orthogonally to all others (e.g., "all else being equal") will decrease alignment between reference states 408 and SUT outputs 410. This can increase interpretability of validation system 400.

Machine-learned calibration model 418 can reason over the outputs of measurement block 412 to generate a score 420. Machine-learned calibration model 418 can include various different architectures, models, and model components. Machine-learned calibration model 418 can be or include a linear model. Machine-learned calibration model 418 can be or include a nonlinear model.

Machine-learned calibration model 418 can calibrate the influence of the differences between reference states 408 and SUT outputs 410. For example, learnable parameters of machine-learned calibration model 418 can weight the values of reference-SUT comparisons 414, SUT context 416, or both (e.g., the products thereof). For example, machine-learned calibration model 418 can generate a learned linear combination of reference-SUT comparisons 414, SUT context 416, or both (e.g., the products thereof). For example, machine-learned calibration model 418 can include or generate attention values over reference-SUT comparisons 414, SUT context 416, or both (e.g., the products thereof) that indicate how much to attend to respective values of reference-SUT comparisons 414, SUT context 416, or both (e.g., the products thereof) when generating an overall score.

Validation system 400 can have different versions or processing pathways for open loop and closed loop evaluation. For example, due to the increasing uncertainty of open-loop outputs over time, a version of machine-learned calibration model 418 or measurement block 412 can identify that SUT outputs 410 are open loop and appropriately downweight or discount divergences over time. For example, for a motion planner that generates new motion plans at 10 hz, an action planned 4 seconds in the future might never be executed, as a new plan is generated and executed at 10 hz. In contrast, closed loop evaluation can implement less discounting over time. A suboptimal maneuver actually performed by a SUT might not be any less suboptimal simply because a time value is offset from a scenario start time.

Score 420 can represent an overall match or alignment between reference states 408 and SUT outputs 410. Score 420 can quantify how much SUT outputs 410 diverge from reference states 408. Score 420 can be an aggregate score that indicates an aggregate divergence between reference states 408 and SUT outputs 410. Validation system 400 can compare score 420 against a threshold to determine whether an amount of divergence is material. For instance, a score below a threshold can correspond to immaterial divergence (e.g., SUT outputs 410 are effectively as "good" as reference states 408, even if they are different in some respects). A score above a threshold can correspond to material divergence (e.g., SUT outputs 410 are not considered to be as "good" as reference states 408 according to a desired validation precision). Validation system 400 can output validation state 422 based on score 420.

Validation state 422 can indicate a positive validation or a lack of validation. Validation state 422 can indicate that SUT 406 at least satisfies a benchmark level of performance.

Validation system 400 (e.g., machine-learned calibration model 418) can be trained or calibrated using a set of labeled matches. Each set of labeled matches can be a unit test. For example, labeled matches can include sets of data that are confirmed to diverge either materially or immaterially. For example, labeled matches can include two trajectories that are confirmed to diverge in a material manner. Labeled matches can include two trajectories that are confirmed to not diverge in a material manner. Training validation system 400 can include updating learnable parameters of machine-learned calibration model 418 until validation system 400 correctly labels the input labeled matches (e.g., correctly determines that the matches either diverge materially or do not diverge materially). For example, validation system 400 can include a type of support vector machine, and labeled matches can provide support vectors that help define a desired decision boundary. Validation system 400 can be trained in separate versions for closed loop and open loop evaluations.

If machine-learned calibration model 418 does not or cannot converge to a set of weights that enables correct labeling of all unit tests, then validation system 400 can add additional expressivity to more fully model the task. For example, validation system 400 can compute additional divergence metrics. Validation system 400 can use additional context metrics (or more nuanced or granular versions of existing metrics). Validation system 400 can add additional learnable parameters to machine-learned model 418. Increasing the expressivity of validation system 400 can increase a precision with which validation system 400 can model a desired decision boundary between trajectories that "match" or are aligned closely enough and trajectories that do not "match" or are not aligned closely enough.

Figure 5:
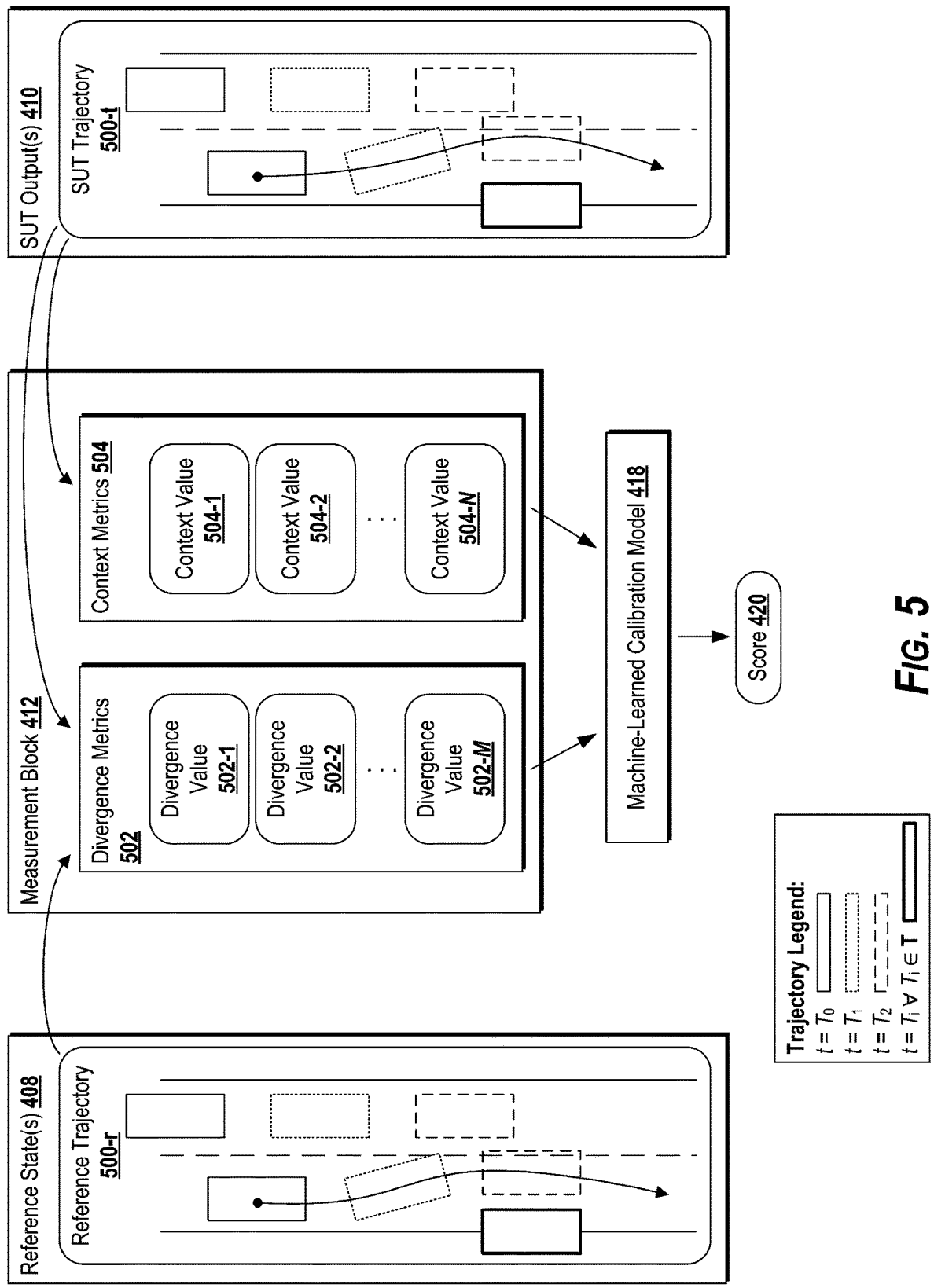
FIG. 5 is a block diagram of an example validation system, according to some implementations of the present disclosure.

FIG. 5 is a block diagram of an example implementation of a measurement block 412 according to example aspects of the present disclosure. Measurement block 412 can process two input trajectories: reference trajectory 500-r and SUT trajectory 500-t. Measurement block 412 can evaluate a plurality of divergence metrics 502 that characterize different aspects in which reference trajectory 500-r diverges from SUT trajectory 500-t. Each divergence metric 502 can have a divergence value: for instance, M divergence metrics can have divergence values 502-1, 502-2, . . . , 502-M. Measurement block 412 can evaluate a plurality of context metrics 504 that characterize different aspects of SUT trajectory 500-t that can inform a relative importance of various divergence metrics. Each context metric can output a context value: for instance, N context metrics can output context values 504-1, 504-2, . . . , 504-N.

Reference trajectory 500-r can be or include data describing a motion of a reference actor through an environment. Reference trajectory 500-r can be parameterized over space and time, such as by indicating waypoints of the trajectory at different time steps. For example, reference trajectory 500-r is illustrated in FIG. 5 with positions for a reference actor and a background actor at three time steps: an initial time $T_0$, an intermediate time $T_1$, and an end time $T_2$. Reference trajectory 500-r is illustrated with an example trajectory for the reference actor to move around a shouldered vehicle that remains the same location for all time steps.

SUT trajectory 500-t can be or include data describing a motion of a SUT-controlled actor through an environment controlled using SUT 406. For example, SUT trajectory 500-t can describe a motion plan (e.g., open loop) or a real or simulated executed motion (e.g., closed loop) obtained using SUT 406. SUT trajectory 500-t can be parameterized over space and time, such as by indicating waypoints of the trajectory at different time steps. For example, SUT trajectory 500-t is illustrated in FIG. 5 with positions for a SUT-controlled actor and the background actor at three time steps: an initial time $T_0$, an intermediate time $T_1$, and an end time $T_2$. SUT trajectory 500-t is illustrated with an example trajectory for the SUT-controlled actor to move around the shouldered vehicle.

Divergence metrics 502 can include one or more operators, models, or other evaluation components that quantify differences between input trajectories. For example, divergence metrics 502 can evaluate differences in vehicle states in input trajectories at a given time step. Divergence metrics 502 can evaluate differences in explicit attributes of the trajectory, such as position, speed or velocity, acceleration, etc. Divergence metrics 502 can be determined with respect to a fixed reference frame or a moveable reference. For instance, divergence metrics 502 can be determined with respect to an actor (e.g., distance from actor, relative velocity with respect to actor, relative acceleration with respect to actor, etc.). Divergence metrics 502 can include a square error of position over all or part of the trajectory. Divergence metrics 502 can evaluate positions or speeds with respect to certain designated areas of or objects in an environment, such as construction zones, emergency vehicles, shouldered vehicles, etc. Divergence metrics 502 can evaluate distances with respect to objects in view of a size of the objects.

Divergence metrics 502 can evaluate differences in latent or implicit attributes. Divergence metrics 502 can include, for instance, an evaluation of how much more burden SUT trajectory 500-t places on other actors in the scene as compared to reference trajectory 500-r (e.g., a rear burden applied by insufficient buffer space behind a leading vehicle; a side burden applied by insufficient buffer space beside an adjacent vehicle; a frontal burden applied by cutting too close in front of a slower vehicle; etc.). Divergence metrics 502 can include, for instance, an evaluation of how much less guarded a SUT-controlled actor is as compared to the reference actor. For example, a guarding metric can compute a difference in severity of different environmental states resulting from a hypothetical hazard being injected into reference scenario (e.g., a surprise cut-in, etc.) during execution of reference trajectory 500-r and SUT trajectory 500-t. Other example divergence metrics 502 can include: SUT-controlled vehicle and actor distance to a merge point where ego and actor lanes merge together; SUT-controlled vehicle-to-actor lateral distance perpendicular to the SUT-controlled vehicle lane; SUT-controlled vehicle occupancy in actor lane; SUT-controlled vehicle and actor L2 box distance (e.g., a minimum L2 box distance); etc.

Divergence metrics 502 can include one or more machine-learned components. For example, a divergence encoder can be configured to generate, based on SUT trajectory 500-t and using one or more machine-learned parameters, a respective divergence value. For example, a latent or implicit attribute of a trajectory can be evaluated by processing the trajectory with the divergence encoder.

Divergence values 502-1, 502-2, . . . , 502-M can be component divergence values used to compute score 420. Score 420 can indicate an aggregate divergence between SUT trajectory 500-t and reference trajectory 500-r.

Context metrics 504 can include one or more operators, models, or other evaluation components that can quantify an importance or impact of divergence values 502-1, 502-2, ..., 502-M returned from divergence metrics 502. Context metrics 504 can be continuous, piecewise continuous, or discretized. For example, context metrics 504 can define bins of contextual features that adjust importance for divergence metrics 502 when the bin is satisfied. For instance, a context metric can include a weather status (e.g., raining, not raining, etc.). Certain divergence metrics can be more impactful if inclement weather impedes visibility, decreases road surface friction, etc. Based on the presence of rain or no rain, a different context value can be obtained that can modify (e.g., weight, scale, etc.) a divergence value.

An example context metric 504 is based on time. For example, as discussed above, divergences that occur at future times offset from a plan time (e.g., $T_0$) can be discounted due to the uncertainty associated with the forecasted world state at that future time. A context metric can include an operator that scales one or multiple divergence values based on a temporal offset from a planning time.

For example, as shown in FIG. 5, an example SUT trajectory 500-$t$ can place the SUT-controlled actor closer to the background actor at t=$T_2$ as compared to reference trajectory 500-$r$. During closed-loop testing, this can result in a high divergence value, because such an incursion on the background actor's lane might be suboptimal and desired to be avoided.

If, on the other hand, SUT trajectory 500-$t$ is an open loop motion plan, the plan may be a reasonable plan as of t=$T_0$. If SUT-controlled vehicle were to implement the plan, it can be expected that the environment would react, such that the background actor may nudge over to allow room for SUT-controlled actor to nudge around the shouldered vehicle. In this manner, for example, an increased proximity to the background actor as compared to reference trajectory 500-$r$ is not necessarily an extreme divergence that would render the plan unacceptable, at least at t=$T_0$. To this end, then, an example context metric can scale or downweight the divergence metric associated with the measured proximity as a function of time.

An example context metric 504 is based on a measured lane overlap of SUT trajectory 500-$t$. For example, an increased proximity to the rear or front of an actor can be more acceptable if there is low lane overlap with the actor. For example, if while changing lanes a SUT-controlled vehicle has closer longitudinal proximity to a leading vehicle than a reference actor, but at the same moment the SUT-controlled vehicle has less lane overlap (e.g., is only 5% in the actor's lane), then the closer proximity can be less burdensome to the leading vehicle.

Divergence values 502-1, 502-2, ..., 502-M and context values 504-1, 504-2, ..., 504-N can be computed at various different scales. For example, a divergence value and a context value can be evaluated on a per-waypoint basis. The context value can adjust the divergence value on a per-waypoint basis. A divergence value and a context value can be evaluated on a per-trajectory basis. For instance, a divergence metric can be accumulated or otherwise computed over the trajectories as a whole. The cumulative divergence value can then be adjusted by a cumulative context value.

Figure 6:
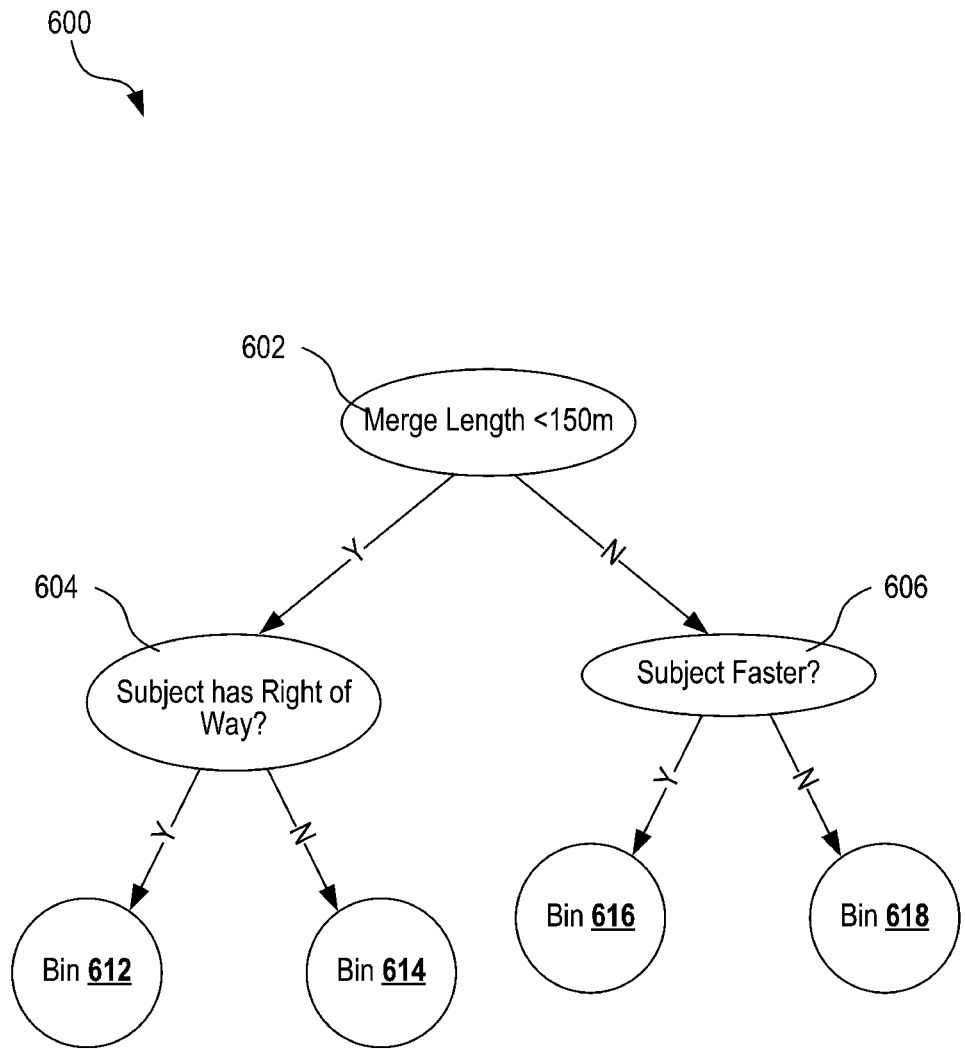
FIG. 6 is an example context tree structure of an example validation system, according to some implementations of the present disclosure.

In an example, a context metric can correspond to nodes of a decision tree. FIG. 6 illustrates an example decision tree 600 for categorizing context states. A root 602 can be a node of a larger tree. Edges connected to root 602 can lead to further nodes 604 and 606 that can further classify context states based on additional parameter states. The bins 612, 614, 616, and 618 can correspond to leaf nodes. Different divergences can be weighted differently for context states in the different bins.

Contexts for various scenarios can be binned based on interpretable features (e.g., as in FIG. 10) that correspond to hand-crafted metrics. In this manner, for instance, the categorization can facilitate high-confidence confirmation that behavior in specific contexts will be prioritized. For instance, whether the SUT-controlled vehicle has right of way can change how impactful various divergences can be. For instance, less guarding behavior might be acceptable when the SUT-controlled vehicle has the right of way, so a divergence metric that evaluates guarding with respect to a reference might be slightly deprioritized. As such, categorizing the bins 612 and 614 according to the right-of-way status can provide interpretable understandings of how different metrics affect the ultimate score. Additionally, or alternatively, the features that define the binning can be latent context features learned by a machine-learned model. For instance, machine-learned mixture models or other clustering models can be configured to describe a distribution of contexts scenarios to identify and cluster groups of contexts that should be evaluated similarly.

Figure 7:
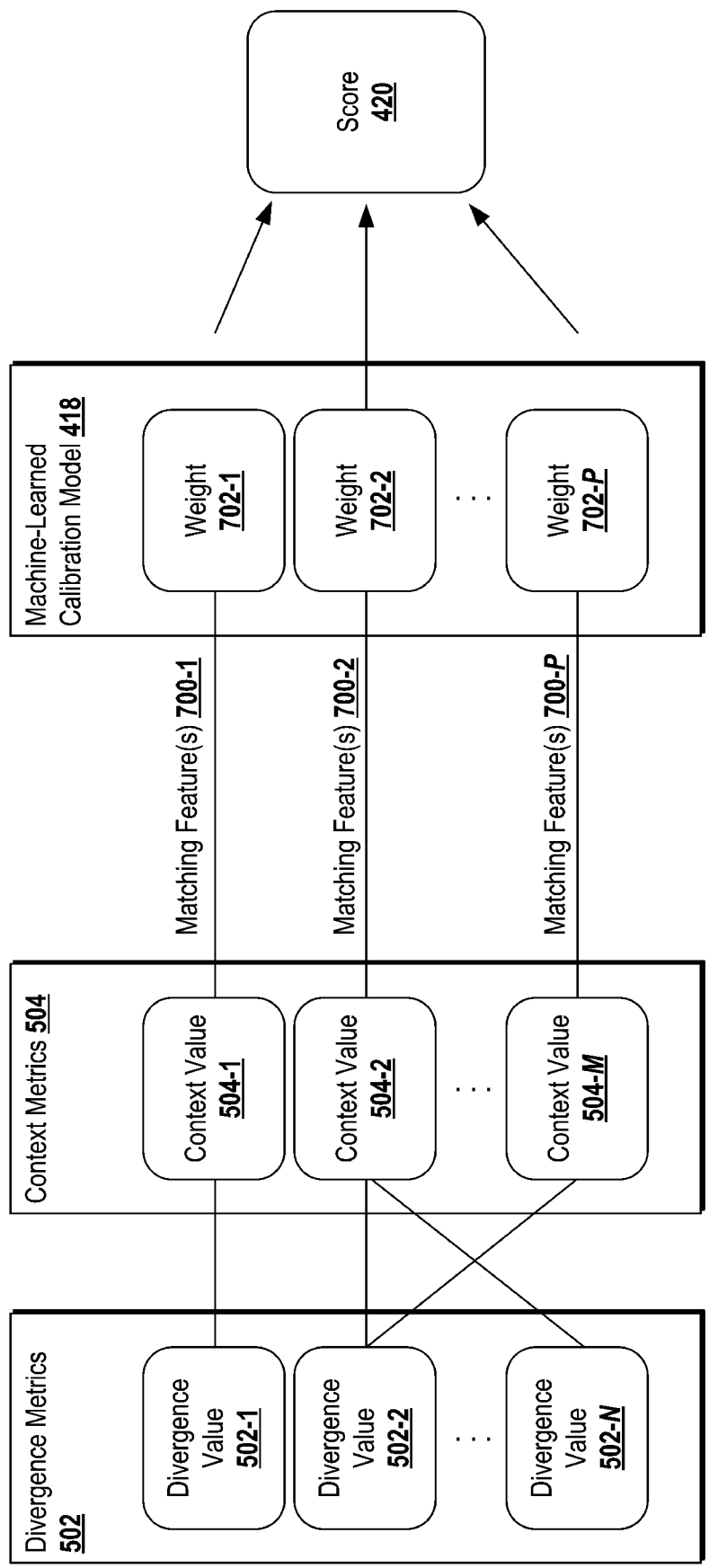
FIG. 7 is a block diagram of an example validation system, according to some implementations of the present disclosure.

FIG. 7 is a block diagram of an example configuration of a machine-learned calibration model 418 according to example aspects of the present disclosure. Context values 504-1, 504-2, ..., 504-N can modify one or more of divergence values 502-1, 502-2, ..., 502-M to obtain P matching features 700-1, 700-2, ..., 700-P. The matching features can reflect a coarse or initial estimate of an influence of various divergence values on score 420. Machine-learned calibration model 418 can include P weights 702-1, 702-2, ..., 702-P that calibrate the influences of the P matching features 700-1, 700-2, ..., 700-P.

For example, machine-learned calibration model 418 can generate a linear combination of the P matching features. In an example, let x represent a vector of the matching feature values and w represent a vector of the P weights of machine-learned calibration model 418. An example score 420 can be computed as $w^T x$ to indicate an aggregate divergence of the input trajectories. The vector w can be constrained to not flip a direction of a value in x (e.g., constrained to be positive) so as to not alter the predetermined effect of a divergence metric. This can aid interpretability and increase expressivity of the model, as the model is freed from having to learn the underlying physical or other concerns that cause the divergence metric to grow. A match can be determined as $w^T x < \theta$, where $\theta$ is a threshold value for determining a match.

To learn weights 702-1, 702-2, ..., 702-P, validation system 400 can leverage a number of unit tests. A unit test can include a pair of trajectories that are confirmed to not have a material divergence or a pair of trajectories that are confirmed to have material divergence. For I positive unit tests (a positive match) and J negative unit tests (no match), learning weights 702-1, 702-2, ..., 702-P can include optimizing weights 702-1, 702-2, ..., 702-P such that $$\max_{i \in \{1,...,I\}} \left[ w^T x^i \right] < \min_{j \in \{1,...,J\}} \left[ w^T x^j \right]$$

where $x^i$ represents the set of matching features for the i-th member of the set of I positive unit tests and where $x^j$ represents the set of matching features for the j-th member of the set of J negative unit tests. In other words, all the computed scores for all the positive unit tests should be less than all the computed scores for all the negative unit tests, since all the negative unit tests by definition have more material divergences. The system can learn weights 702-1, 702-2, ..., 702-P with additional objectives, such as to find the smallest set of such weights that satisfy the above criterion.

The output can be reshaped using various scaling and transformations to obtain a score mapped to a desired range (e.g., [0, 1]) having a desired threshold. For example, the output can be rescaled using $$\frac{1}{1+e^{w^T x - \theta}}.$$

Matching features can be a linear product of a divergence value and a context value. Matching features can be based on the divergence values and the context values in more complex arrangements. For instance, context metrics can map to one or more bins of context states. One approach is to have a different context value for each bin, where the different context values can modify the same divergence metric. Another approach is to generate different divergence metric instances for each bin, such that as contexts for a particular trajectory fall into a bin, the corresponding divergence metric is used for computing a divergence. This divergence metric can directly supply a matching feature x that may not be further adjusted by an explicit context value before being processed by machine-learned calibration model 418.

An efficient computational technique for computing these different metrics uses a tensor product (e.g., a Kronecker product) of a vector of indicator functions h(y) where y is a context value and a vector of divergence values x. Computing the tensor product can include generating a block matrix that contains a number and arrangement of blocks that respectively correspond to a number and arrangement of values in a first matrix (e.g., a 2×2 first matrix leads to a product with 2×2 blocks). In each block, a corresponding value of the first matrix uniformly scales an entire second matrix, such that the block size is the size of the second matrix. This computational structure using a linear classifier can allow for efficient expansion of a feature set.

A constraint over the context features can force the context metrics to have a monotonic effect on the resulting matching feature. For instance, the effect of the context can be constrained such that as the context value increases, the matching feature value increases as well gets larger, the match score is weighted more highly. This can be accomplished by using, as the indicator functions, step basis functions. The step basis functions can be activated at the beginning of the domain covered to each bin. Instead of indicator functions that "turn off" when exiting the bin (e.g., generating one-hot vector over a distribution of bins), example step functions can continue to be activated after an initial threshold is satisfied, such that the overall matching feature value grows cumulatively. For example, a resulting indicator vector, rather than having elements of value 0 everywhere with 1 at only one element, instead can contain multiple 1 values after an initial activation (e.g. [0,0,1,1,1] rather than [0,0,1,0,0]). In an example, this can provide a piecewise constant and monotonic function of the context. The magnitudes of the step functions can be determined by corresponding context values (e.g., corresponding to the bins) and thereby weight the divergence values differently in each bin.

A context value itself can be a piecewise linear and monotonic function. For instance, instead of step functions, ramp or other piecewise linear functions can be used in h(y). The ramps can be centered on a sequence of knot points or joints that anchor a particular range over which the context value is to vary. The joints can be positioned using learned transitions or hard-coded.

In an example expression, let b=eigen_pwl(x,k) be an operator that receives an input divergence metric value x and a vector of knot points k and returns a basis vector b such that a dot product of the basis vector b with a vector of slopes s provides a piecewise linear function F having the specified slopes.

An example divergence metric $F_{divergence}$ for a measurement m can then be expressed as $$F_{divergence}(m) = \text{eigen\_pwl}(m,k) \cdot s$$

where $F_{divergence}(m)$ is a piecewise linear function in m where when $m \leq k_0$, the slope is $s_0$, when $k_0 < m \leq k_1$, the slope is $s_1$, etc.

Similarly, an example context metric $F_{context}$ for a measurement n can then be expressed as $$F_{context}(n) = \text{eigen\_pwl}(n,v) \cdot z$$

where $F_{context}(n)$ is a piecewise linear function in n where when $n \leq v_0$, the slope is $z_0$, when $v_0 < n \leq v_1$, the slope is $z_1$, etc.

An example matching feature then can be expressed as:

$$F_{matching}(m,n) = F_{divergence}(m) \cdot F_{context}(n) = d \cdot [\text{eigen\_pwl}(n,v) \otimes \text{eigen\_pwl}(m,k)]$$

where a set of weights d can be factorized as $$d = z \otimes s.$$

For example, z and s can be individually learned and selected based on engineered logic or physical constraints or principles. Alternatively, values of d can be learned directly (e.g., corresponding to weights of machine-learned calibration model 418), subject to various constraints (e.g., constraints on a change of sign to regularize the learned model). For example, the effect of the context and the divergence can be initialized with unit-valued functions, and machine-learned calibration model 418 can calibrate the magnitudes of the slopes to dial in the result. In this manner, for instance, the resulting function $F_{matching}(m, n)$ can be linear in all its parameters (e.g., the slopes) and can be jointly piecewise linear in the inputs (e.g., m and n).

In some scenarios, a highly regularized, constrained model can provide improved performance with high interpretability and low risk of overfitting, thereby enabling strong out-of-domain performance. In some implementations, more complex machine-learned models can be used.

Figure 8:
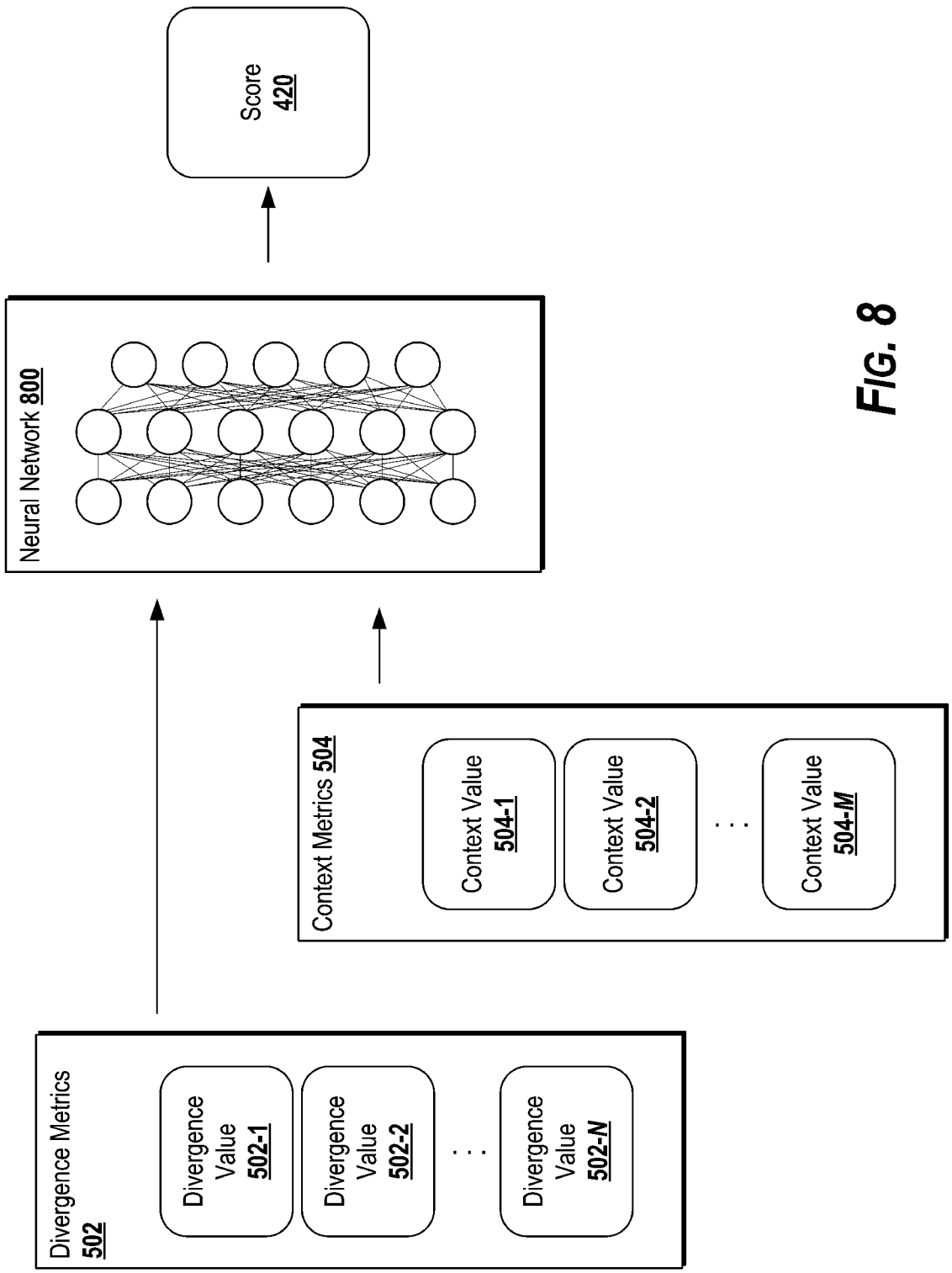
FIG. 8 is a block diagram of an example validation system, according to some implementations of the present disclosure.

For instance, FIG. 8 is a block diagram illustrating an example implementation in which a neural network 800 can process input data based on divergence metrics 502 and context metrics 504. Although a fully connected network is illustrated, various different architectures can be used, such as transformer-based architectures, CNNs, RNN, LSTM, feedforward networks, etc. The network can be linear or nonlinear.

The neural network can include a number of weights that can outnumber the quantity of divergence metrics 502 and context metrics 504. The neural network can be small. The neural network can have only a small number of layers, such as one, two, or three layers, although more layers can be used (e.g., less than 10, less than 20, etc.). The simplest, single-layer linear neural network can effectively represent a linear weighted combination as described above.

An input dimension of the neural network can match a quantity of divergence metrics 502. A number of channels of an input layer can include a channel for divergence values and a channel for context values. Divergence values and context values can be concatenated and processed in one channel.

In some cases, data describing an SUT trajectory and a reference trajectory may be provided directly to the neural network 800. That is, divergence metrics 502 may not be computed explicitly. In such cases, the weights of neural network 800 may implicitly encode the divergence metrics 502 and evaluate whether the divergences, in the aggregate, are material. In such cases, training the neural network 800 may include providing a plurality of training examples to the neural network 800, where a respective training example includes data describing a training trajectory and a reference trajectory. The output of the neural network 800 during the iteration of training can be evaluated against a label indicating a divergence validation state between the training trajectory and the reference trajectory, and the weights of the neural network 800 can be updated based on the evaluation.

Figure 9:
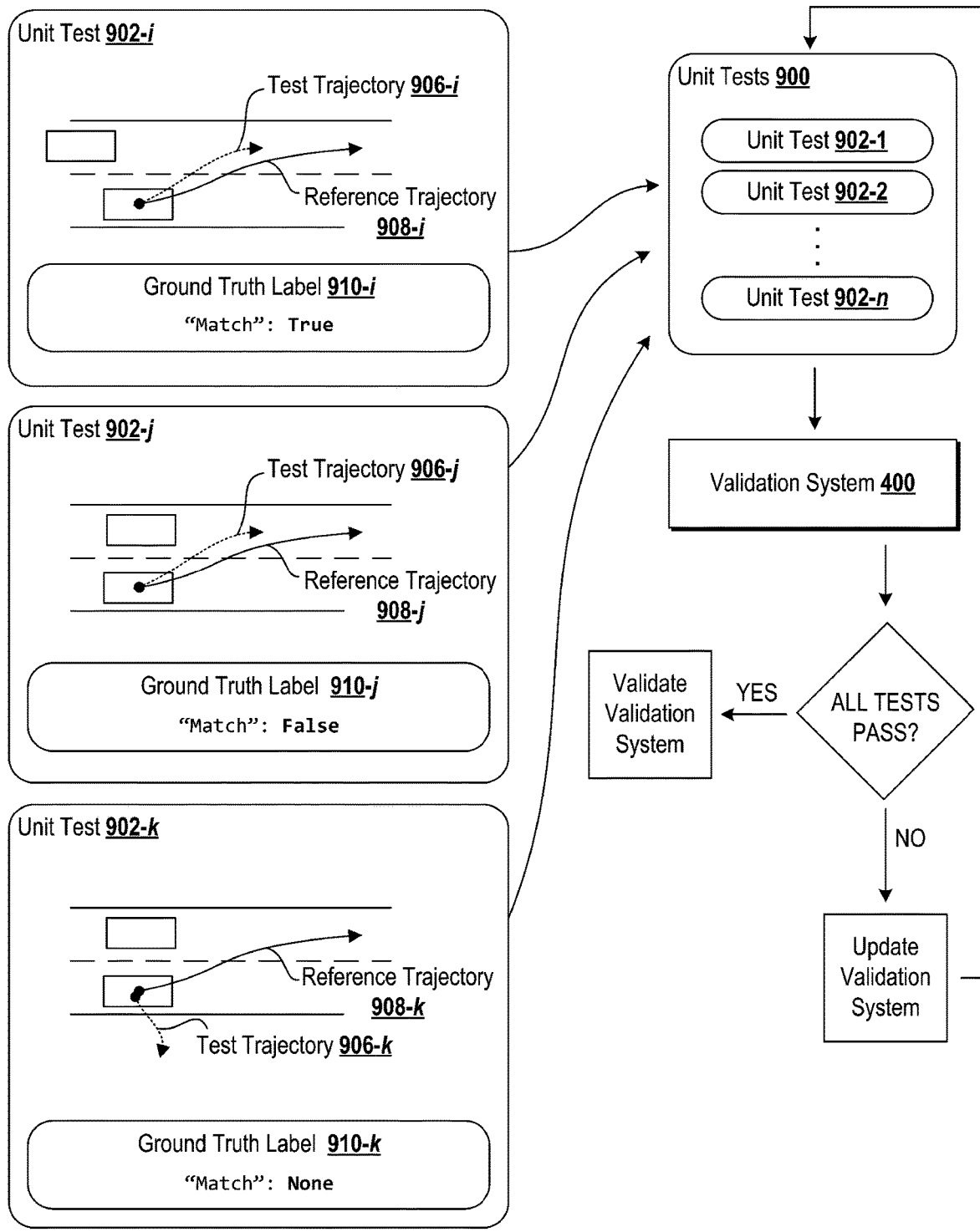
FIG. 9 is a block diagram of a system for training an example validation system, according to some implementations of the present disclosure.

FIG. 9 is a block diagram of an example system for updating validation system 400 using a set of unit tests 900. Unit tests 900 can include one or more unit tests 902-1, 902-2, . . . , 902-n.

An example unit test 902-$i$ can include a test trajectory 906-$i$ and a reference trajectory 908-$i$. Unit test 902-$i$ can be associated with a ground truth label 910-$i$ that records a validation or evaluation state of the match between test trajectory 906-$i$ and reference trajectory 908-$i$. For instance, unit test 902-$i$ can record a value "Match": True that indicates that test trajectory 906-$i$ is valid and matches reference trajectory 908-$i$.

An example unit test 902-$j$ can include a test trajectory 906-$j$ and a reference trajectory 908-$j$. Unit test 902-$j$ can be associated with a ground truth label 910-$j$ that records a validation or evaluation state of the match between test trajectory 906-$j$ and reference trajectory 908-$j$. For instance, unit test 902-$j$ can record a value "Match": False that indicates that test trajectory 906-$j$ is a valid trajectory but does not match reference trajectory 908-$j$.

An example unit test 902-$k$ can include a test trajectory 906-$k$ and a reference trajectory 908-$k$. Unit test 902-$k$ can be associated with a ground truth label 910-$k$ that records a validation or evaluation state of the match between test trajectory 906-$k$ and reference trajectory 908-$k$. For instance, unit test 902-$k$ can record a value "Match": None that indicates that test trajectory 906-$k$ is not a valid trajectory for the scenario (e.g., the error with respect to reference trajectory 908-$k$ is so great as to be spurious).

Validation system 400 can process one or more unit tests to determine whether validation system 400 correctly identifies the match label. For instance, validation system 400 can include one or more adjustable thresholds. A first threshold can be set such that scores above the threshold correspond to "Match": True. The first threshold can be set such that scores below the threshold correspond to "Match": False. A second threshold can be set such that scores below the threshold correspond to "Match": None.

Validation system 400 can process all unit tests 900. A system can update/optimize (iteratively/numerically or analytically) parameters of validation system 400 (e.g., weights, thresholds, etc.) such that all unit tests pass. Passing a unit test can include generating an evaluation state that aligns with the stored evaluation state associated with the unit test. For instance, each unit test can represent a confirmed judgment (e.g., a human judgment) that a given object detection matches a label, does not match a label, or is spurious. Evaluation system 400 can pass a unit test if it correctly identifies the evaluation state for the unit test.

If one or more unit tests fail, then the behavior of validation system 400 may be deviating from expectations. In some situations, a failed unit test indicates a suboptimal selection of learnable parameters of validation system 400, and further training can produce a set of parameters that cause validation system 400 to pass all unit tests. In some cases, however, the expressive power of validation system 400 is too constrained to satisfy all unit tests. In such cases, for example, additional terms, degrees of freedom, parameters, etc. can be added to validation system 400 to enable validation system 400 to fully model all unit tests.

In a simplified example, for instance, if a unit test required that validation system 400 severely penalize any error in lane-centering behavior—and validation system 400 did not have any context metric associated with lane boundaries—then there may be no set of optimal parameters which would cause validation system 400 to pass all unit tests, so long as validation system 400 is unable to recognize the lane center and penalize errors accordingly. Resolving the impasse can include adding a context metric that conveys lane boundary data. In this manner, for instance, if validation system 400 is unable to satisfy all unit tests, then additional features can be added (e.g., additional divergence metrics, additional context metrics) to increase an expressive power of validation system 400.

In an example, using three levels of values of Match can enable validation system 400 to both evaluate a quality of trajectory generations and prune spurious trajectories using a single framework (e.g., using the score(s) computed using Reference-SUT Comparison(s) 414 and SUT Context(s) 416).

Validation system 400 can be used online or offline. For instance, validation system 400 can be used online to evaluate a quality of a trajectory generation by a motion planner. Validation system 400 can be used offline to evaluate a benchmark performance of a new motion planner over a set of benchmark scenarios to evaluate the new motion planner for performance advancement, regression, or minimum performance baselines.

Figure 10:
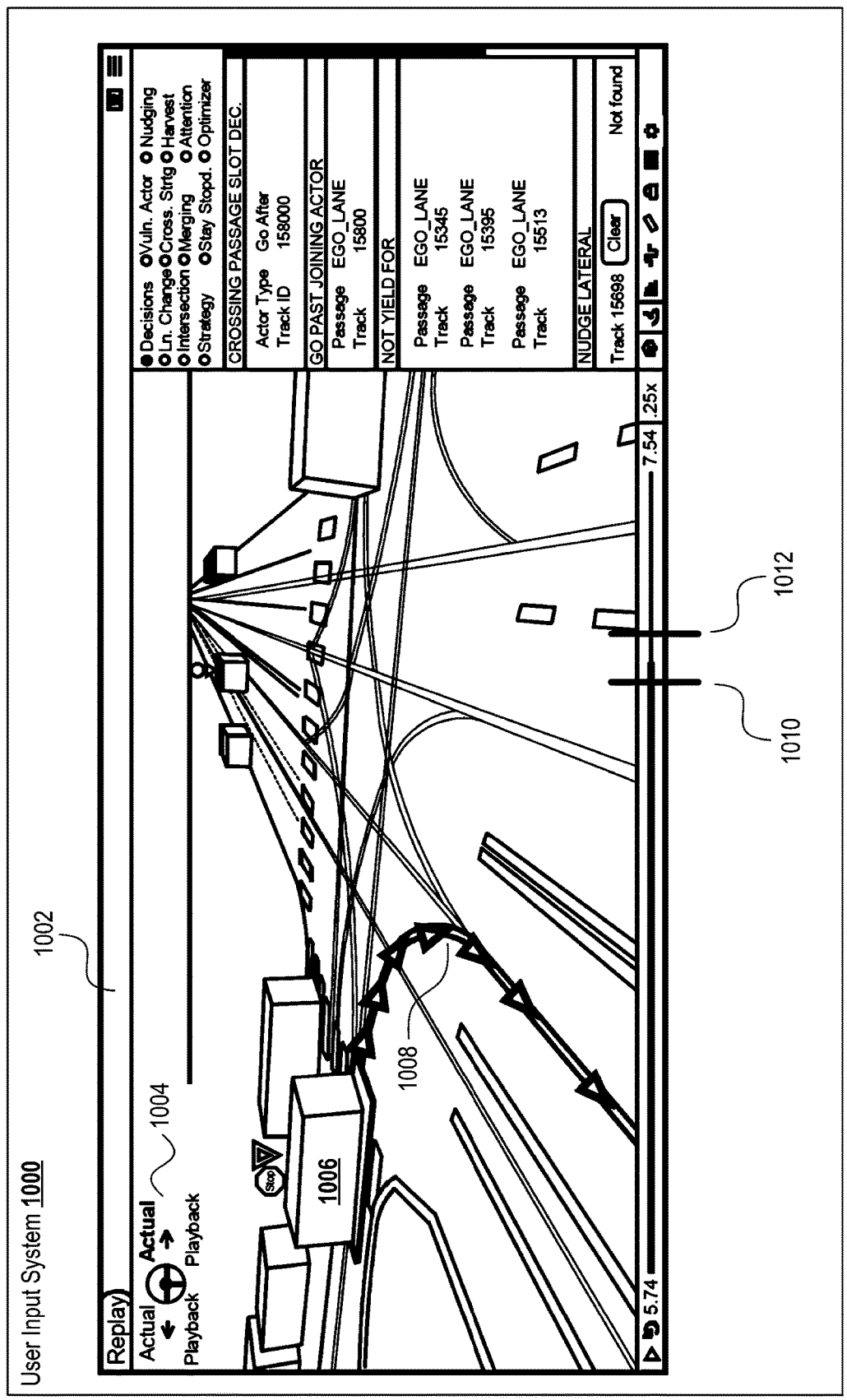
FIG. 10 is an example user interface for an example validation system, according to some implementations of the present disclosure.

FIG. 10 is an illustration of an example interface of a user input system 1000 that human operators can use to input reference state(s) 408 (e.g., reference trajectories 500-$r$). An interface 1002 can present a rendering of log data that can be "replayed"—that is, log data at various time steps can be presented in sequence (e.g., controlled by playback controls 1004) to facilitate review of the behavior of an ego vehicle 1006 in a scenario.

A user can interact with the interface 1002 to draw a reference trajectory 1008. Drawing a trajectory can include tracing a path across an input surface (e.g., touch-sensitive input surface, using a cursor, etc.). Drawing a trajectory can include selecting coordinates at which to anchor waypoints for the trajectory. A user can interact with interface 1002 to designate time intervals within which the annotations are valid (e.g., an initiation time of a reference trajectory). For example, interface 1002 can receive inputs that associate points on a timeline with beginning and ending times of a time interval (e.g., inputs selecting positions 1010 and 1012 on a timeline element).

User input system 1000 can facilitate review of pairs of trajectories for labeling the pairs as positive matches or negative matches. For example, interface 1002 can render two trajectories: one reference trajectory and one SUT trajectory. Interface 1002 can display an input element that, when selected, causes user input system 1000 to store a label indicating that the trajectories do not materially diverge. Interface 1002 can display an input element that, when selected, causes user input system 1000 to store a label indicating that the trajectories do materially diverge.

User input system 1000 can facilitate review of a number of SUT outputs 410 in different reference scenarios. For example, user input system 1000 can cause input interface 1002 to display a set of SUT trajectories 500-*t* that are ranked or filtered according to one or more criteria. For instance, a value of an individual divergence metric or context metric can be used for ranking or filtering. For example, user input system 1000 can receive an input requesting a listing of SUT trajectories 500-*t* that have the highest divergence value in a particular metric (e.g., highest divergence in acceleration, highest divergence in actor rear burden, etc.). In this manner, for instance, the structure of the validation system 400 itself into interpretable divergence metrics can facilitate more granular interrogation of how SUT 406 is diverging to reveal potential underlying causes of such divergences.

Figure 11:
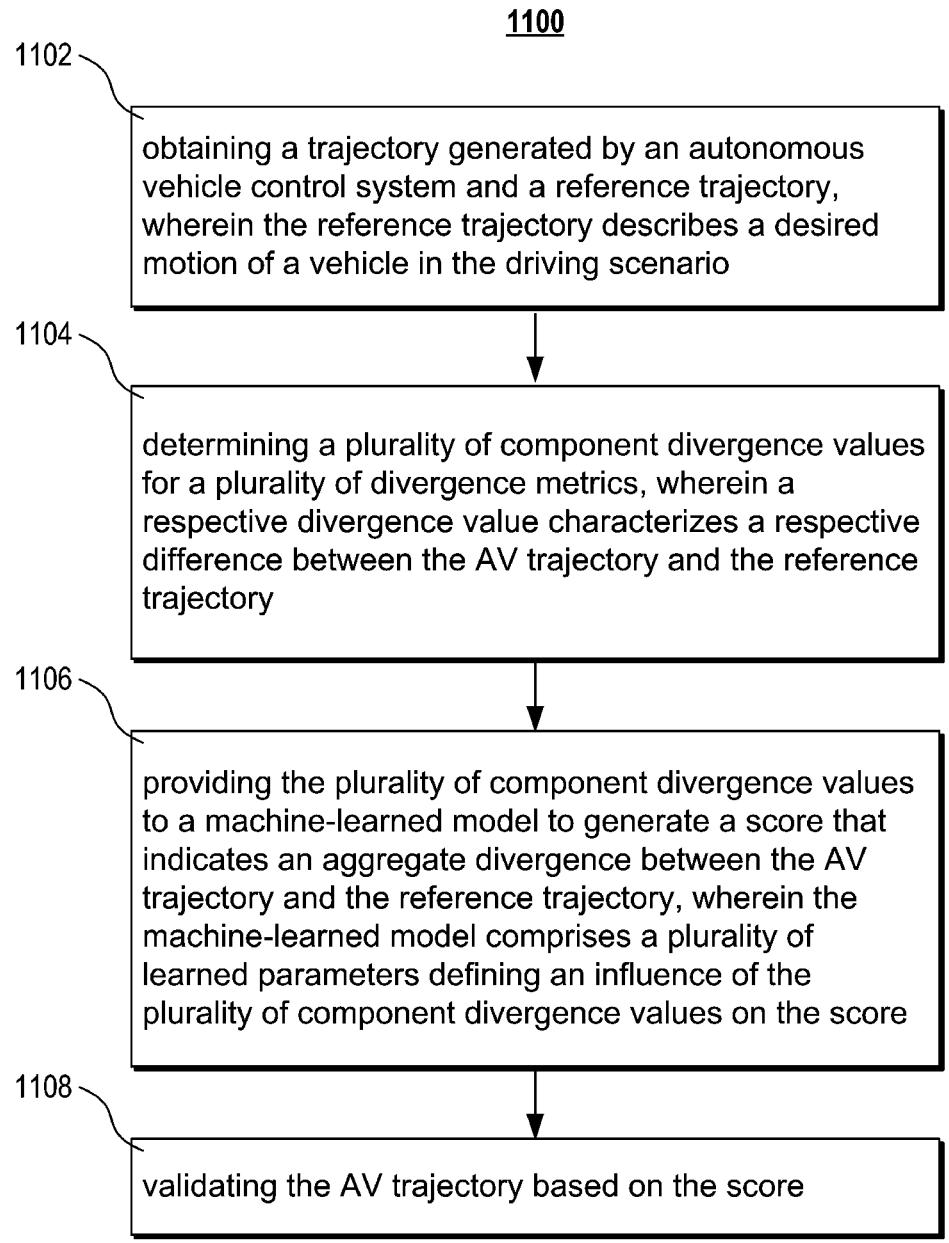
FIG. 11 is a flowchart of an example method for validating a motion planner, according to some implementations of the present disclosure.

FIG. 11 is a flowchart of an example method 1100 for validating a motion planner according to aspects of the present disclosure. One or more portions of example method 1100 can be implemented by the computing systems described with reference to the other figures (e.g., autonomous platform 110, vehicle computing system 180, remote system 160, a system of FIGS. 1 to 14, etc.). Each respective portion of example method 1100 can be performed by any (or any combination) of one or more computing devices. Moreover, one or more portions of example method 1100 can be implemented on the hardware components of the devices described herein (e.g., as in FIGS. 1 to 14, etc.).

FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of example method 1100 can be performed additionally, or alternatively, by other systems.

At 1102, example method 1100 can include obtaining a trajectory generated by an autonomous vehicle control system (e.g., an AV trajectory) and a reference trajectory. For example, an AV trajectory can be an SUT trajectory 500-*t* generated by an autonomous vehicle control system under test (SUT 406). A reference trajectory can be reference trajectory 500-*r*. A validation system 400 can obtain the trajectories to validate SUT 406.

In some implementations of example method 1100, the reference trajectory describes a desired motion of a vehicle in a particular driving scenario. For instance, reference trajectory 500-*r* can describe a ground truth or exemplar motion of an actor in a reference scenario. For instance, reference scenario 404 can include a portion of reference data 402 that describes a scene or event of interest. Reference scenario 404 can include data that focuses on a particular maneuver (e.g., a lane change, navigating an intersection, performing an evasive maneuver, etc.).

At 1104, example method 1100 can include determining a plurality of component divergence values for a plurality of divergence metrics. For example, validation system 400 can determine a plurality of divergence values 502-1, 502-2, . . . , 502-M. Each of divergence values 502-1, 502-2, . . . , 502-M can be computed for a corresponding divergence metric 502.

In some implementations of example method 1100, a respective divergence value characterizes a respective difference between the AV trajectory and the reference trajectory for a particular divergence metric. Divergence metrics 502 can evaluate differences in explicit attributes of the trajectory, such as position, speed, or acceleration. For example, one divergence metric 502 can be a square error of position over all or part of the trajectory. Additionally, or alternatively, divergence metrics 502 can evaluate positions or speeds with respect to certain designated areas of or objects in an environment, such as construction zones, emergency vehicles, shouldered vehicles, etc. Divergence metrics 502 can evaluate distances with respect to objects in view of a size of the objects.

Divergence metrics 502 can evaluate differences in latent or implicit attributes. Divergence metrics 502 can include, for instance, an evaluation of how much more burden SUT trajectory 500-*t* places on other actors in the scene as compared to reference trajectory 500-*r* (e.g., a rear burden applied by insufficient buffer space behind a leading vehicle; a side burden applied by insufficient buffer space beside an adjacent vehicle; a front burden applied by cutting too close in front of a slower vehicle; etc.). Divergence metrics 502 can include, for instance, an evaluation of how much less guarded an SUT-controlled vehicle is as compared to the reference actor. For example, a guarding metric can compute a difference in severity of different environmental states resulting from a hypothetical hazard being injected into a reference scenario (e.g., a surprise cut-in, etc.) during execution of reference trajectory 500-*r* and SUT trajectory 500-*t*.

At 1106, example method 1100 can include providing the plurality of component divergence values to a machine-learned model to generate a score that indicates an aggregate divergence between the AV trajectory and the reference trajectory. For instance, divergence values 502-1, 502-2, . . . , 502-M can be adjusted or scaled by context values 504-1, 504-2, . . . , 504-N and input to machine-learned calibration model 418.

Machine-learned calibration model 418 can generate score 420. Score 420 can represent an overall match or alignment between reference states 408 and SUT outputs 410. Score 420 can be an aggregate score that indicates an aggregate divergence between reference states 408 (e.g., including a reference trajectory 500-*r*) and SUT outputs 410 (e.g., including SUT trajectory 500-*t*).

Machine-learned calibration model 418 can include a plurality of learned parameters defining an influence of the plurality of component divergence values on the score. In some implementations of example method 1100, the score includes a weighted combination of the plurality of component divergence values. In some implementations of example method 1100, the weighted combination is a linear combination. For example, weights of machine-learned calibration model can perform the weighted combination.

At 1108, example method 1100 can include validating the AV trajectory based on the score. In some implementations of example method 1100, validating the AV trajectory includes comparing the score to a threshold. For instance, validation system 400 can compare score 420 against a threshold to determine whether an amount of divergence is material. For instance, a score below a threshold can correspond to immaterial divergence (e.g., SUT outputs 410 are effectively as "good" as reference states 408, even if they are different in some respects). A score above a threshold can correspond to material divergence (e.g., SUT outputs 410 are not considered to be as "good" as reference states 408 according to a desired validation precision). Validation system 400 can output validation state 422 based on score 420.

In some implementations, example method 1100 can include, prior to providing the plurality of component divergence values to the machine-learned model, learning parameters of the machine-learned model. Learning the parameters of the machine-learned model can include determining the plurality of learned parameters based on a plurality of training examples.

In some implementations of example method 1100, determining the plurality of learned parameters based on a plurality of training examples can include, for a respective training example, determining a plurality of component divergence values characterizing a difference between a training trajectory and a reference trajectory. In some implementations, determining the plurality of learned parameters based on a plurality of training examples can include, for the respective training example, generating, using the machine-learned model, a validation output based on the plurality of component divergence values. In some implementations, determining the plurality of learned parameters based on a plurality of training examples can include, for the respective training example, comparing the validation output to a label that indicates a validation state.

In some implementations, a respective training example includes (i) a training trajectory and a reference trajectory. In some implementations of example method 1100, a respective training example includes (ii) a label indicating a validation state between the training trajectory and the reference trajectory (e.g., Match: True, Match: False, Match: None, etc.). In some implementations of example method 1100, the label indicates whether there is a material divergence between the training trajectory and the reference trajectory.

In some implementations, a respective training example includes (i) a plurality of component divergence values characterizing a difference between a training trajectory and a reference trajectory. In some implementations of example method 1100, a respective training example includes (ii) a label indicating a divergence between the training trajectory and the reference trajectory. In some implementations of example method 1100, the label indicates whether there is a material divergence between the training trajectory and the reference trajectory.

For example, one or more machine-learned components of validation system 400 (e.g., machine-learned calibration model 418) can be trained using a set of labeled pairs of trajectories. For example, labeled pairs can include sets of data that are confirmed to diverge either materially or immaterially. For example, labeled pairs can include two trajectories that are labeled as diverging in a material manner. Labeled pairs can include two trajectories that are labeled as not diverging in a material manner. Training validation system 400 can include updating learnable parameters of machine-learned calibration model 418 until validation system 400 correctly labels the input labeled pairs (e.g., correctly determines that the matches either diverge materially or do not diverge materially). For example, validation system 400 can include a type of a support vector machine, and labeled matches can provide support vectors that help define a desired decision boundary. Validation system 400 can be trained in separate versions for closed loop and open loop evaluations. Validation system 400 can include other types of learnable model architectures, such as regression models, neural networks, transformer-based architectures, CNNs, RNN, LSTM, feedforward networks, etc. Example networks are described above with respect to FIG. 8.

In some implementations of example method 1100, the plurality of learned parameters respectively correspond to the plurality of divergence metrics. For instance, a machine-learned calibration model 418 can include P parameters that can correspond to the N divergence values from N divergence metrics. For example, each divergence metric can correspond to a learned calibration parameter that can be adjusted to calibrate an influence of that divergence metric on score 420.

In some implementations of example method 1100, example method 1100 can include weighting a respective contribution of the respective component divergence value using a context value obtained using a context metric. For example, a context value can scale or otherwise adjust an influence of a given divergence metric on score 420.

In some implementations of example method 1100, the context metric measures an interval between a validation time and a time associated with the respective component divergence value. For instance, a context metric can be configured to discount future divergences based on an uncertainty associated with forecasts on which the divergence relies. For instance, a divergence computed between a future position of an SUT-controlled actor and another actor can be associated with an uncertainty because the actual positioning of the actors in the future can change interactively based on many different intervening factors. A context metric can include an operator that scales one or multiple divergence values based on a temporal offset from a planning time.

In some implementations of example method 1100, the context value indicates a relationship between the AV trajectory and an environment of the driving scenario. An example context metric 504 is based on a measured lane overlap of SUT trajectory 500-*t*. For example, an increased proximity to the rear or front of an actor can be more acceptable if there is low lane overlap with the actor. For example, if while changing lanes a SUT-controlled vehicle has closer longitudinal proximity to a leading vehicle than a reference actor, but at the same moment the SUT-controlled vehicle has less lane overlap (e.g., is only 5% in the actor's lane), then the closer proximity can be less burdensome to the leading vehicle.

In some implementations of example method 1100, the context metric maps a plurality of context domains over a decision tree. FIG. 6 illustrates an example decision tree 600 for categorizing context states.

In some implementations of example method 1100, example method 1100 can include determining, using the context metric and based on an attribute of the AV trajectory or the reference trajectory, a context domain for the respective component divergence value. For example, a context domain can correspond to a segment of a piecewise context value function, such that component divergence values that map to a particular context domain are adjusted using a context value from the piecewise context value function for that particular domain.

In some implementations of example method 1100, example method 1100 can include weighting the respective contribution of the respective component divergence value based on a weighting parameter associated with the context domain. For instance, the weighting parameter can be a context value.

In some implementations of example method 1100, at least one divergence metric corresponds to a divergence encoder that is configured to generate, based on the test trajectory and using one or more machine-learned parameters, the respective component divergence. For instance, divergence metrics 502 can include one or more machine-learned components. For example, a divergence encoder can be configured to generate, based on SUT trajectory 500-$t$ and using one or more machine-learned parameters, a respective divergence value. For example, a latent or implicit attribute of a trajectory can be evaluated by processing the trajectory with the divergence encoder.

In some implementations of example method 1100, the machine-learned model is optimized based on constraints indicated by a curated set of AV trajectories and reference trajectories. The curated set can be, for instance, a set of unit tests. For instance, to learn weights of machine-learned validation model 418, validation system 400 can leverage a number of unit tests. In some implementations of example method 1100, the curated set of trajectory matches includes positive match examples and negative match examples. For example, a unit test can include a pair of trajectories that are confirmed to not have a material divergence or a pair of trajectories that are confirmed to have material divergence. The system can learn weights for the model such that all unit tests are passed. The system can learn weights for the model such that machine-learned validation model 418 outputs scores 420 that enable correct labeling of the trajectory pairs. In this manner, for instance, the unit tests can help describe a decision boundary for machine-learned model 418 by including tests on either side of the boundary. Passing all the unit tests can indicate that validation system 400's decision boundary is within a sufficient distance of the desired decision boundary. In some implementations of example method 1100, the machine-learned model defines a decision boundary for classifying the positive match examples and the negative match examples.

In some implementations of example method 1100, the machine-learned model includes a support vector machine or a machine-learned model that is configured in the same manner as a support vector machine. For example, parameters of machine-learned model 418 can be learned to increase a margin with which it satisfies all the unit tests.

A positive match example can be an example in which a first aggregate divergence between a first respective AV trajectory and a first respective reference trajectory is below a threshold. For example, validation system 400 can compare score 420 against a threshold to determine whether an amount of divergence is material. For instance, a score below a threshold can correspond to immaterial divergence (e.g., SUT outputs 410 are effectively as "good" as reference states 408, even if they are different in some respects).

A negative match example can be an example in which a second aggregate divergence between a second respective AV trajectory and a second respective reference trajectory is above the threshold. For example, a score above a threshold can correspond to material divergence (e.g., SUT outputs 410 are not considered to be as "good" as reference states 408 according to a desired validation precision).

In some implementations of example method 1100, the AV trajectory describes a planned trajectory output by a motion planner of the autonomous vehicle control system operating in an open loop. In some implementations of example method 1100, the AV trajectory describes executed behavior of an autonomous vehicle controlled by the autonomous vehicle control system operating in a closed loop.

For instance, SUT outputs 410 can describe closed loop SUT behavior or open loop SUT behavior. Closed loop evaluation can include determining what actions or operations SUT 406 performs over time while interacting with reference scenario 404. For example, closed loop evaluation can include determining whether a simulated AV would remain stopped at an intersection for a duration of a stoplight and then enter and cross the intersection after the light turns green. During closed loop evaluation, SUT 406 can benefit from feedback from the environment and adapt its behavior accordingly (e.g., reacting to the light turning green). Closed-loop behavior can span multiple processing cycles of, for example, a motion planner, as the motion planner can provide updated motion plans to adapt the motion of the vehicle as it moves through the environment. In an aspect, closed loop evaluation can focus on what a SUT does in lieu of or in addition to what the SUT expects or plans to do. Closed loop evaluation can be referred to as "on policy" evaluation.

Open loop evaluation can include determining what actions or operations SUT 406 plans to do based on a current state (which can include prior observations) of a scenario. For example, open loop evaluation can include comparing a selected motion plan generated by SUT 406 with a trajectory described by reference states 408. In this manner, for instance, validation system 400 can evaluate whether SUT 406 generates and correctly prioritizes a motion plan that reflects appropriate behavior in the circumstances. Open loop evaluation can be implemented in as few as a single cycle of a motion planner, for instance. In an aspect, open loop evaluation can focus on what the SUT expects or plans to do, with the expectation that appropriate plans across a wide range of scenarios will facilitate appropriate operation over such scenarios. Open loop evaluation can be referred to as "off policy" evaluation.

Figure 12:
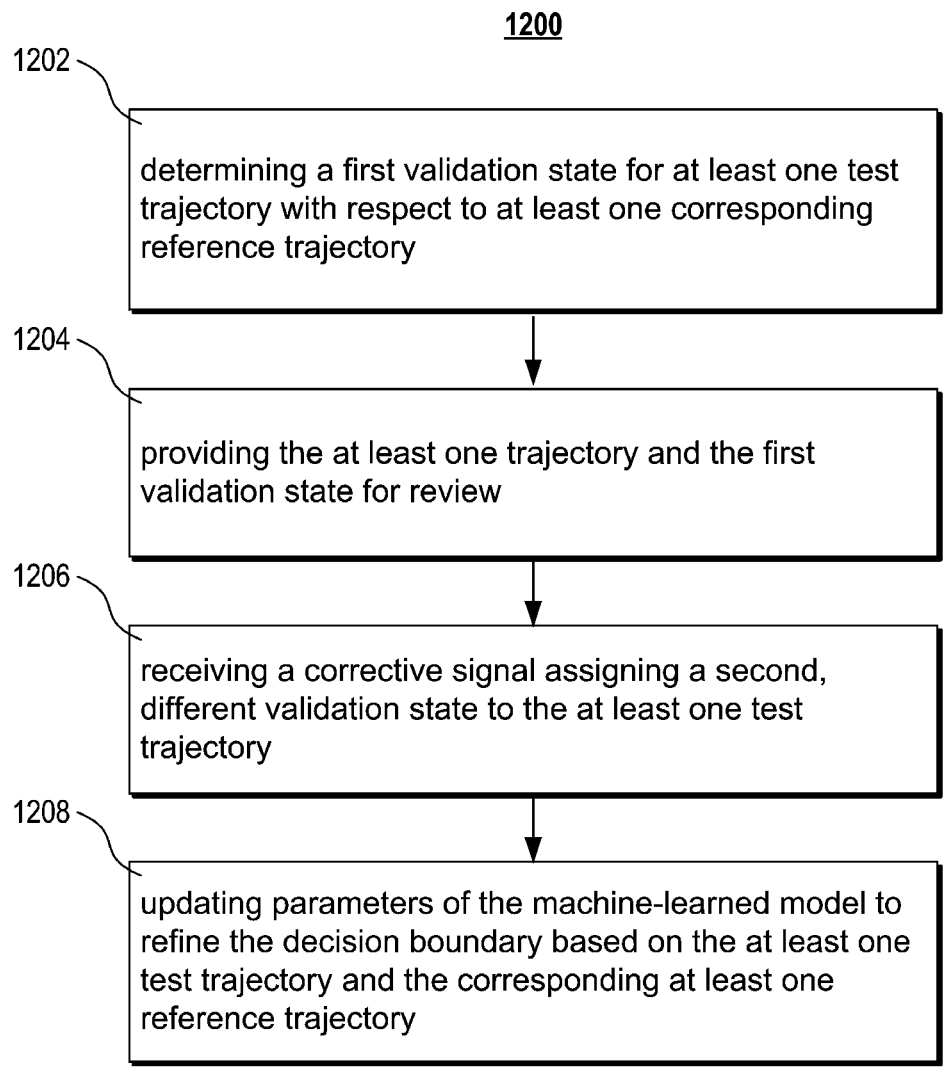
FIG. 12 is a flowchart of an example method for updating a validation system, according to some implementations of the present disclosure.

FIG. 12 is a flowchart of an example method 1200 for updating a machine-learned component of a validation system according to aspects of the present disclosure. One or more portions of example method 1200 can be implemented by the computing systems described with reference to the other figures (e.g., autonomous platform 110, vehicle computing system 180, remote system 160, a system of FIGS. 1 to 14, etc.). Each respective portion of example method 1200 can be performed by any (or any combination) of one or more computing devices. Moreover, one or more portions of example method 1200 can be implemented on the hardware components of the devices described herein (e.g., as in FIGS. 1 to 14, etc.).

FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of example method 1200 can be performed additionally, or alternatively, by other systems.

At 1202, example method 1200 can include determining a first validation state for at least one test trajectory with respect to at least one corresponding reference trajectory. For example, a test trajectory can be a SUT trajectory 500-$t$. A reference trajectory can be reference trajectory 500-$r$. The validation state can indicate whether the test trajectory is materially different from the reference trajectory.

At 1204, example method 1200 can include providing the at least one test trajectory and the first validation state for review. For example, a user interface 1000 can render data describing the test trajectory and the first validation state.

At 1206, example method 1200 can include receiving a corrective signal assigning a second, different validation state to the at least one test trajectory. For instance, user interface 1000 can receive input data indicating that the first validation state was incorrect.

For example, a first validation state can be a false positive or a false negative. For instance, a false positive validation state can indicate an absence of a material divergence (e.g., an indicated "match"). A false positive validation state can correspond to an indicated match between SUT trajectory 500-*t* and reference trajectory 500-*r* when the trajectories do in fact materially diverge. A false positive can result from processing a novel scenario 404 that was not reflected in the set of unit tests used to learn the values of machine-learned calibration model 418.

A false negative validation state can correspond to an indicated material divergence between SUT trajectory 500-*t* and reference trajectory 500-*r* when the trajectories do not in fact materially diverge. A false negative can result from processing a novel scenario 404 that was not reflected in the set of unit tests used to learn the values of machine-learned calibration model 418.

At 1206, example method 1200 can include updating parameters of the machine-learned model to refine the decision boundary based on the at least one test trajectory and the corresponding at least one reference trajectory. For instance, the second, different validation state can be a label applied to the pair of the at least one test trajectory and the at least one corresponding reference trajectory. This labeled pair can be a new unit test to add to the set of unit tests that define the decision boundary of validation system 400. Learnable parameters of validation system 400 can be re-learned based on the updated set of unit tests.

If machine-learned calibration model 418 does not or cannot converge to a set of weights that enables correct labeling of all unit tests, then validation system 400 can add additional expressivity to more fully model the task. For example, validation system 400 can compute additional divergence metrics. Validation system 400 can use additional context metrics (or more nuanced or granular versions of existing metrics). Validation system 400 can add additional learnable parameters to machine-learned model 418. Increasing the expressivity of validation system 400 can increase a precision with which validation system 400 can model a desired decision boundary between trajectories that "match" or are aligned closely enough and trajectories that do not "match" or are not aligned closely enough.

Figure 13:
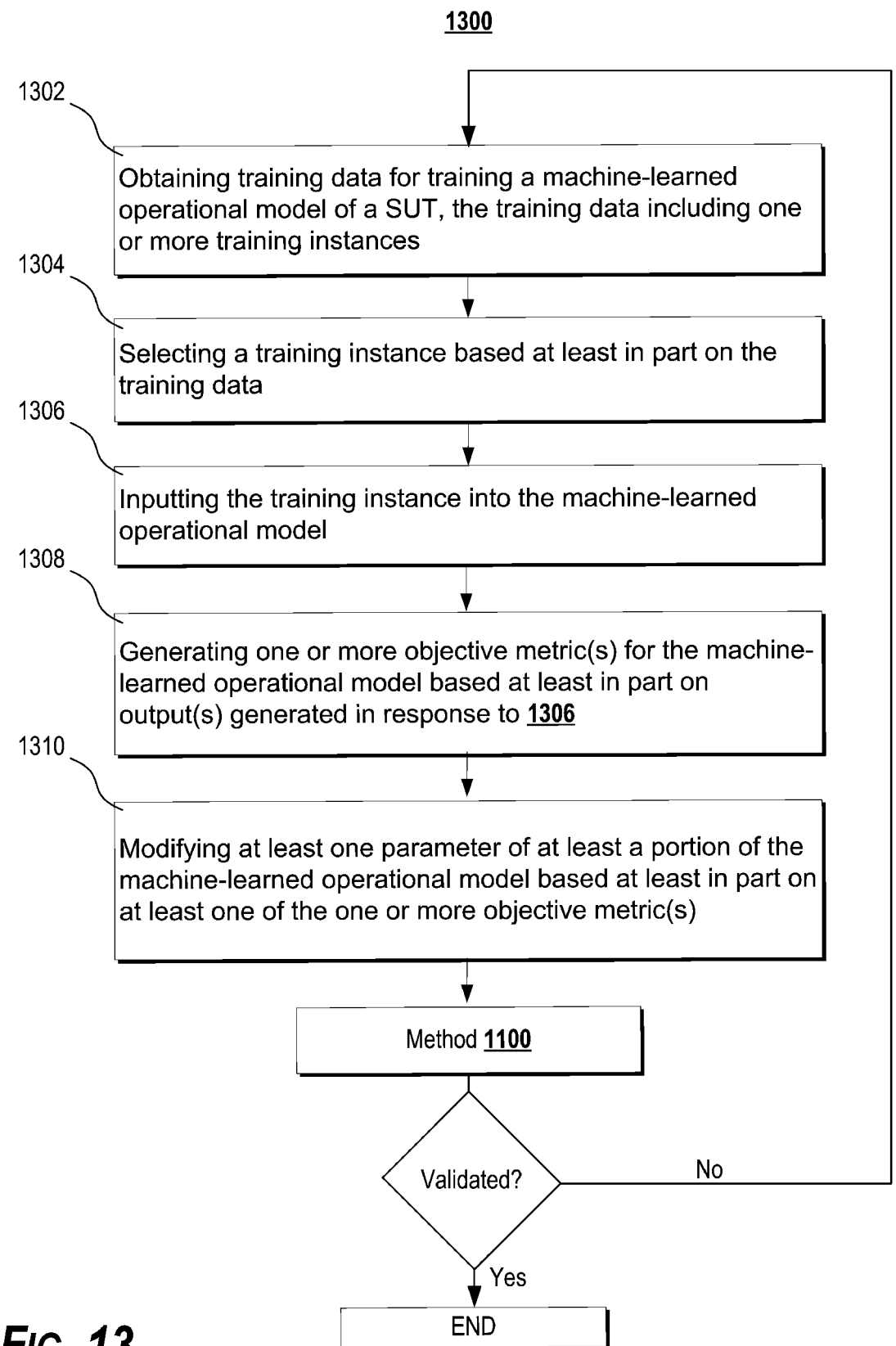
FIG. 13 is a flowchart of an example method for training and validating a machine-learned operational system, according to some implementations of the present disclosure.

FIG. 13 is a flowchart of an example method 1300 for training one or more machine-learned operational models, according to aspects of the present disclosure. For instance, an operational system can include a machine-learned operational model (e.g., one or more of localization system 230, perception system 240, planning system 250, or control system 260).

One or more portions of example method 1300 can be implemented by a computing system that includes one or more computing devices such as, for example, the computing systems described with reference to the other figures (e.g., autonomous platform 110, vehicle computing system 180, remote system 160, a system of FIGS. 1 to 14, etc.). Each respective portion of example method 1300 can be performed by any (or any combination) of one or more computing devices. Moreover, one or more portions of example method 1300 can be implemented on the hardware components of the devices described herein (e.g., as in FIGS. 1 to 14, etc.), for example, to validate one or more systems or models.

FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of example method 1300 can be performed additionally, or alternatively, by other systems.

At 1302, example method 1300 can include obtaining training data for training a machine-learned operational model. The training data can include a plurality of training instances.

The training data can be collected using one or more autonomous platforms (e.g., autonomous platform 110) or the sensors thereof as the autonomous platform is within its environment. By way of example, the training data can be collected using one or more autonomous vehicles (e.g., autonomous platform 110, autonomous vehicle 110, autonomous vehicle 350, etc.) or sensors thereof as the vehicle operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 1304, example method 1300 can include selecting a training instance based at least in part on the training data.

At 1306, example method 1300 can include inputting the training instance into the machine-learned operational model.

At 1308, example method 1300 can include generating one or more loss metrics and/or one or more objectives for the machine-learned operational model based on outputs of at least a portion of the machine-learned operational model and labels associated with the training instances.

At 1310, example method 1300 can include modifying at least one parameter of at least a portion of the machine-learned operational model based at least in part on at least one of the loss metrics and/or at least one of the objectives. For example, a computing system can modify at least a portion of the machine-learned operational model based at least in part on at least one of the loss metrics and/or at least one of the objectives.

In some implementations, the machine-learned operational model can be trained in an end-to-end manner. For example, in some implementations, the machine-learned operational model can be fully differentiable.

After being updated, the operational model or the operational system including the operational model can be provided for validation (e.g., according to example implementations of example method 1000, etc.). In some implementations, a validation system can evaluate or validate the operational system. The validation system can trigger retraining, decommissioning, etc. of the operational system based on, for example, failure to satisfy a validation threshold in one or more areas.

Figure 14:
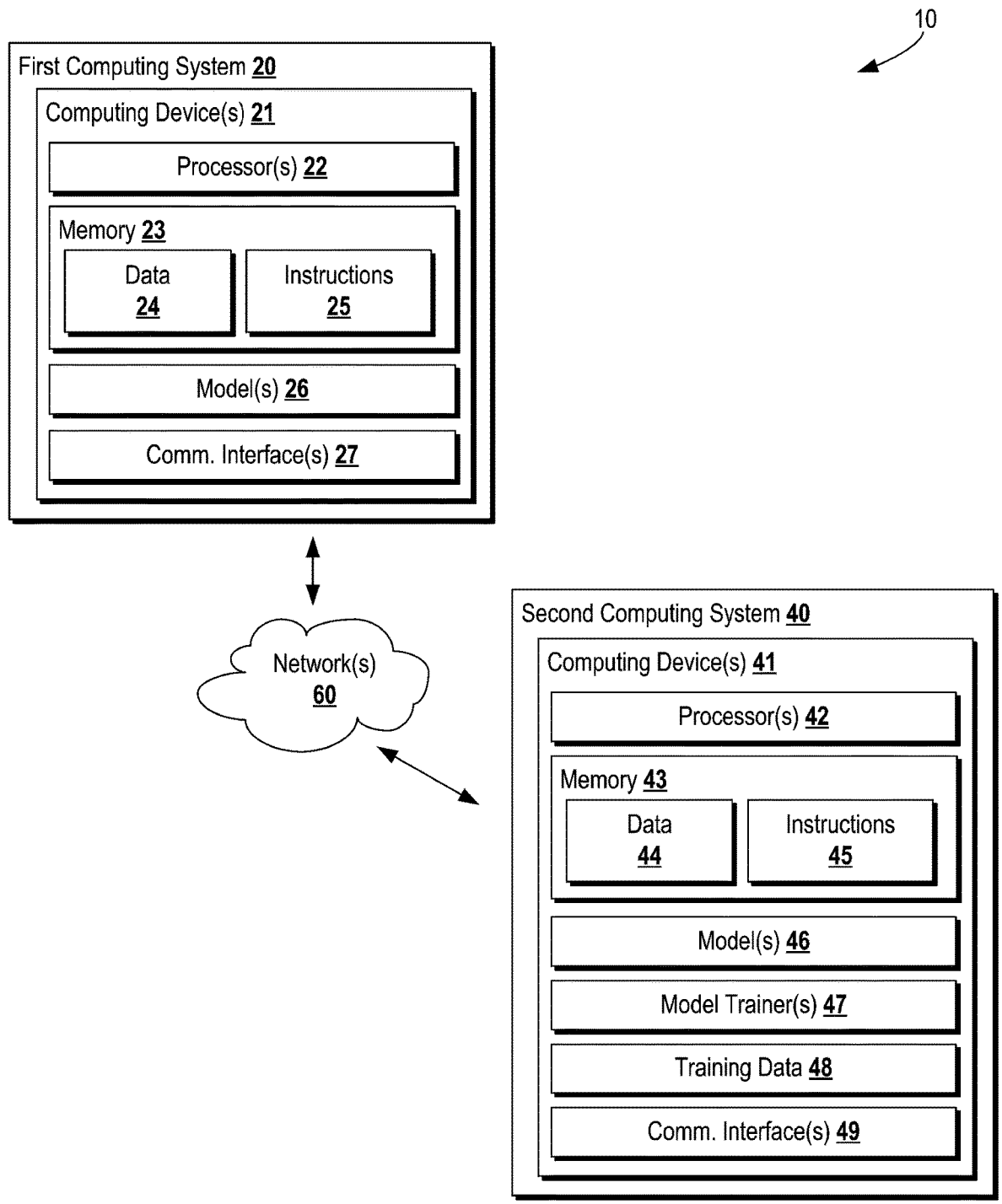
FIG. 14 is a block diagram of an example computing system, according to some implementations of the present disclosure.

FIG. 14 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system 160, the onboard computing system 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing devices 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory devices that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processors 22.

For example, the memory 23 can store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface 27 to communicate with the second computing system 40 over the network 60. For instance, the first computing system 20 can store the models 26 (e.g., one or more machine-learned models) in memory 23. The first computing system 20 can then use or otherwise implement the models 26 (e.g., by the processors 22). By way of example, the first computing system 20 can implement the models 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory devices that are remote from the second computing system 40.

Memory 43 can also store computer-readable instructions 45 that can be executed by the one or more processors 42. The instructions 45 can be software written in any suitable programming language or can be implemented in hardware.

Additionally, or alternatively, the instructions 45 can be executed in logically or virtually separate threads on the processors 42.

For example, memory 43 can store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the models 26 at the first computing system 20, the second computing system 40 can include one or more models 46. As examples, the models 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the models 26 or the models 46 through the use of one or more model trainers 47 and training data 48. The model trainer 47 can train any one of the models 26 or the models 46 using one or more training or learning algorithms. One example training technique is backwards propagation of errors. In some implementations, the model trainer 47 can perform supervised training techniques using labeled training data. In other implementations, the model trainer 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer 47 for training or testing the models 26 or the models 46. By way of example, the model trainer 47 can train one or more components of a machine-learned model for the autonomy system 200 through unsupervised training techniques using an objective function (e.g., costs, rewards, metrics, constraints, etc.). In some implementations, the model trainer 47 can perform a number of generalization techniques to improve the generalization capability of the models being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train models 26. For example, in some implementations, the first computing system 20 can include a computing system onboard or otherwise associated with a real or simulated autonomous vehicle. In some implementations, models 26 can include perception or machine vision models configured for deployment onboard or in service of a real or simulated autonomous vehicle. In this manner, for instance, the second computing system 40 can provide a training pipeline for training models 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network 60). In some implementations, the communication interfaces 27, 49 can include, for example, one or more of a communications controller, receiver, transceiver, transmitter, port, conductors, software or hardware for communicating data.

The network 60 can be any type of network or combination of networks that allows for communication between devices. In some implementations, the network can include one or more of a local area network, wide area network, the Internet, secure network, cellular network, mesh network, peer-to-peer communication link or some combination thereof and can include any number of wired or wireless links. Communication over the network 60 can be accomplished, for instance, through a network interface using any type of protocol, protection scheme, encoding, format, packaging, etc.

FIG. 14 illustrates one example computing ecosystem 10 that can be used to implement the present disclosure. For example, one or more systems or devices of ecosystem 10 can implement any one or more of the systems and components described in the preceding figures. Other systems can be used as well. For example, in some implementations, the first computing system 20 can include the model trainer 47 and the training data 48. In such implementations, the models 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing devices remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the case of the reader and do not denote a particular order of steps or operations. An operation illustrated by a list identifier of (a), (i), etc. can be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations. X might be unable to perform Y and remain within the scope of the present disclosure.

What is claimed is:

1. A computer-implemented method for validating a trajectory generated by an autonomous vehicle control system ("the AV trajectory") in a driving scenario, comprising:
   (a) obtaining the AV trajectory and a reference trajectory, wherein the reference trajectory describes a desired motion of a vehicle in the driving scenario;
   (b) determining a plurality of component divergence values for a plurality of divergence metrics, wherein a respective divergence value characterizes a respective difference between the AV trajectory and the reference trajectory;
   (c) providing the plurality of component divergence values to a machine-learned model to generate a score that indicates an aggregate divergence between the AV trajectory and the reference trajectory, wherein the machine-learned model comprises a plurality of learned parameters defining an influence of the plurality of component divergence values on the score; and
   (d) validating the AV trajectory based on the score.

2. The computer-implemented method of claim 1, further comprising, prior to (c), determining the plurality of learned parameters based on a plurality of training examples, wherein a respective training example comprises (i) a training trajectory and a reference trajectory and (ii) a label indicating a validation state between the training trajectory and the reference trajectory.

3. The computer-implemented method of claim 2, wherein the label indicates whether there is a material divergence between the training trajectory and the reference trajectory.

4. The computer-implemented method of claim 1, wherein the plurality of learned parameters respectively correspond to the plurality of divergence metrics.

5. The computer-implemented method of claim 1, comprising:
   weighting a respective contribution of the respective component divergence value using a context value obtained using a context metric, wherein the context value indicates a relationship between the AV trajectory and an environment of the driving scenario.

6. The computer-implemented method of claim 5, comprising:
   determining, using the context metric and based on an attribute of the AV trajectory or the reference trajectory, a context domain for the respective component divergence value; and
   weighting the respective contribution of the respective component divergence value based on a weighting parameter associated with the context domain.

7. The computer-implemented method of claim 5, wherein the context metric maps a plurality of context domains over a decision tree.

8. The computer-implemented method of claim 5, wherein the context metric measures an interval between:
   a validation time; and
   a time associated with the respective component divergence value.

9. The computer-implemented method of claim 1, wherein the score comprises a weighted combination of the plurality of component divergence values.

10. The computer-implemented method of claim 9, wherein the weighted combination is a linear combination.

11. The computer-implemented method of claim 1, wherein at least one divergence metric corresponds to a divergence encoder that is configured to generate, based on the AV trajectory and using one or more machine-learned parameters, the respective component divergence.

12. The computer-implemented method of claim 1, wherein validating the AV trajectory comprises comparing the score to a threshold.

13. The computer-implemented method of claim 1, wherein the machine-learned model is optimized based on constraints indicated by a curated set of AV trajectories and reference trajectories.

14. The computer-implemented method of claim 13, wherein:
the curated set of trajectory matches comprises positive match examples and negative match examples; and
the machine-learned model defines a decision boundary for classifying the positive match examples and the negative match examples.

15. The computer-implemented method of claim 14, wherein the machine-learned model comprises a support vector machine.

16. The computer-implemented method of claim 14, wherein:
a positive match example is an example in which a first aggregate divergence between a first respective AV trajectory and a first respective reference trajectory is below a threshold; and
a negative match example is an example in which a second aggregate divergence between a second respective AV trajectory and a second respective reference trajectory is above the threshold.

17. The computer-implemented method of claim 1, wherein the AV trajectory describes a planned trajectory output by a motion planner of the autonomous vehicle control system operating in open loop.

18. The computer-implemented method of claim 1, wherein the AV trajectory describes executed behavior of an autonomous vehicle controlled by the autonomous vehicle control system operating in closed loop.

19. One or more non-transitory computer-readable media storing instructions that are executable by one or more processors to cause a computing system to perform operations for validating a trajectory generated by an autonomous vehicle control system ("the AV trajectory") in a driving scenario, the operations comprising:
(a) obtaining the AV trajectory and a reference trajectory, wherein the reference trajectory describes a desired motion of a vehicle in the driving scenario;
(b) determining a plurality of component divergence values for a plurality of divergence metrics, wherein a respective divergence value characterizes a respective difference between the AV trajectory and the reference trajectory;
(c) providing the plurality of component divergence values to a machine-learned model to generate a score that indicates an aggregate divergence between the AV trajectory and the reference trajectory, wherein the machine-learned model comprises a plurality of learned parameters defining an influence of the plurality of component divergence values on the score; and
(d) validating the AV trajectory based on the score.

20. A computing system, comprising:
one or more processors; and
one or more non-transitory computer-readable media storing instructions that are executable by the one or more processors to cause the computing system to perform operations for validating a trajectory generated by an autonomous vehicle control system ("the AV trajectory") in a driving scenario, the operations comprising:
(a) obtaining the AV trajectory and a reference trajectory, wherein the reference trajectory describes a desired motion of a vehicle in the driving scenario;
(b) determining a plurality of component divergence values for a plurality of divergence metrics, wherein a respective divergence value characterizes a respective difference between the AV trajectory and the reference trajectory;
(c) providing the plurality of component divergence values to a machine-learned model to generate a score that indicates an aggregate divergence between the AV trajectory and the reference trajectory, wherein the machine-learned model comprises a plurality of learned parameters defining an influence of the plurality of component divergence values on the score; and
(d) validating the AV trajectory based on the score.

* * * * *